US012047871B2

(12) United States Patent
McCann et al.

(10) Patent No.: US 12,047,871 B2
(45) Date of Patent: *Jul. 23, 2024

(54) DISCOVERING NETWORK INFORMATION AVAILABLE VIA WIRELESS NETWORKS

(71) Applicant: Malikie Innovational Limited, Dublin (IE)

(72) Inventors: Stephen McCann, Southampton (GB); Michael Peter Montemurro, Toronto (CA)

(73) Assignee: Malikie Innovations Limited, Dublin (IE)

( * ) Notice: Subject to any disclaimer, the term of this patent is extended or adjusted under 35 U.S.C. 154(b) by 269 days.

This patent is subject to a terminal disclaimer.

(21) Appl. No.: 17/514,626

(22) Filed: Oct. 29, 2021

(65) Prior Publication Data

US 2022/0053414 A1    Feb. 17, 2022

Related U.S. Application Data

(63) Continuation of application No. 16/261,131, filed on Jan. 29, 2019, now Pat. No. 11,166,226, which is a continuation of application No. 15/785,121, filed on Oct. 16, 2017, now Pat. No. 10,200,941, which is a continuation of application No. 14/298,289, filed on Jun. 6, 2014, now Pat. No. 9,794,967, which is a
(Continued)

(51) Int. Cl.
*H04B 7/00*    (2006.01)
*H04W 48/16*    (2009.01)
*H04W 84/12*    (2009.01)

(52) U.S. Cl.
CPC ............ *H04W 48/16* (2013.01); *H04W 84/12* (2013.01)

(58) Field of Classification Search
CPC ...................................................... H04W 48/16
USPC .......................................................... 370/310
See application file for complete search history.

(56) References Cited

U.S. PATENT DOCUMENTS 6,283,143 B1    9/2001    Adachi, Jr. et al.
6,493,561 B1    12/2002    Hasegawa
(Continued)

FOREIGN PATENT DOCUMENTS

CN    1893396 A    1/2007
CN    1969529 A    5/2007
(Continued)

OTHER PUBLICATIONS

Hiller, T., et al.; "A Container Type for the Extensible Authentication Protocol (EAP)"; Network Working Group; draft-hiller-eap-tlv-01.txt; May 2003; 16 pages.
(Continued)

*Primary Examiner* — Temica M Beamer
(74) *Attorney, Agent, or Firm* — Conley Rose, P.C.; J. Robert Brown, Jr.

(57) ABSTRACT

Network information may be discoverable without requiring a connection to that network. For example, Access Network Query Protocol ("ANQP") may allow a device to discover information about a network prior to the device associating with that network. In other words, ANQP allows a network terminal to request additional network information prior to establishing network capability. The additional network information that may be discoverable includes network latency, cellular capabilities, hotspot capabilities, mobility capabilities, neighbor reports, station identification, and multiple hotspot session identification.

19 Claims, 9 Drawing Sheets

Related U.S. Application Data continuation of application No. 13/234,799, filed on Sep. 16, 2011, now Pat. No. 8,750,180.

(56) References Cited

U.S. PATENT DOCUMENTS

| | | |
|---|---|---|
| 7,010,305 B2 | 3/2006 | Immonen et al. |
| 7,065,645 B2 | 6/2006 | Teicher |
| 7,151,764 B1 | 12/2006 | Teinonen et al. |
| 7,187,691 B2 | 3/2007 | Gavette |
| 7,277,932 B2 | 10/2007 | Adachi et al. |
| 7,376,097 B2 | 5/2008 | Yegin |
| 7,606,209 B2 | 10/2009 | Watanabe |
| 7,683,773 B1 | 3/2010 | Goodall et al. |
| 7,684,333 B1 | 3/2010 | Dasylva et al. |
| 8,170,481 B2 | 5/2012 | Rangarajan et al. |
| 8,274,908 B2 | 9/2012 | Hsin et al. |
| 8,374,122 B2 | 2/2013 | Meier et al. |
| 8,411,640 B2 | 4/2013 | Kuroda |
| 8,442,024 B2 | 5/2013 | Montemurro et al. |
| 8,458,279 B2 | 6/2013 | Montemurro et al. |
| 8,463,175 B2 | 6/2013 | Bajko |
| 8,514,807 B2 | 8/2013 | Kim et al. |
| 8,594,064 B2 | 11/2013 | Kaushik et al. |
| 8,605,673 B2 | 12/2013 | Xiao et al. |
| 8,626,073 B2 | 1/2014 | Ruuska |
| 8,681,769 B2 | 3/2014 | Montemurro et al. |
| 8,750,180 B2 | 6/2014 | McCann et al. |
| 8,775,533 B2 | 7/2014 | Hassan et al. |
| 8,792,489 B2 | 7/2014 | Anantharam et al. |
| 8,868,071 B2 | 10/2014 | Ha et al. |
| 8,879,455 B1 | 11/2014 | Stephenson et al. |
| 8,897,788 B2 | 11/2014 | Ruuska |
| 8,929,346 B2 | 1/2015 | Montemurro et al. |
| 8,942,221 B2 | 1/2015 | McCann et al. |
| 9,137,621 B2 | 9/2015 | McCann et al. |
| 9,204,299 B2 | 12/2015 | McCann et al. |
| 9,301,127 B2 | 3/2016 | McCann et al. |
| 9,615,383 B2 | 4/2017 | Montemurro et al. |
| 9,622,155 B2 | 4/2017 | McCann et al. |
| 9,794,967 B2 | 10/2017 | McCann et al. |
| 9,820,199 B2 | 11/2017 | McCann et al. |
| 9,942,316 B2 | 4/2018 | McCann et al. |
| 10,142,921 B2 | 11/2018 | McCann et al. |
| 10,200,941 B2 | 2/2019 | McCann et al. |
| 10,349,321 B2 | 7/2019 | McCann et al. |
| 10,356,662 B2 | 7/2019 | Montemurro et al. |
| 10,470,106 B2 | 11/2019 | Bajko et al. |
| 10,736,020 B2 | 8/2020 | McCann et al. |
| 10,812,964 B2 | 10/2020 | McCann et al. |
| 10,893,442 B2 | 1/2021 | Montemurro et al. |
| 11,166,226 B2 | 11/2021 | McCann et al. |
| 2002/0086675 A1 | 7/2002 | Mansour |
| 2002/0141369 A1 | 10/2002 | Perras |
| 2002/0159418 A1 | 10/2002 | Rudnick et al. |
| 2002/0169883 A1 | 11/2002 | Bright et al. |
| 2003/0103521 A1 | 6/2003 | Raphaeli et al. |
| 2003/0117984 A1 | 6/2003 | Gavette |
| 2003/0134636 A1 | 7/2003 | Sundar et al. |
| 2003/0217168 A1 | 11/2003 | Adachi et al. |
| 2004/0014422 A1 | 1/2004 | Kallio |
| 2004/0090958 A1 | 5/2004 | Park et al. |
| 2004/0199661 A1 | 10/2004 | Murdock |
| 2005/0060319 A1 | 3/2005 | Douglas |
| 2005/0090259 A1 | 4/2005 | Jain et al. |
| 2005/0097362 A1 | 5/2005 | Winget et al. |
| 2005/0111419 A1 | 5/2005 | Kwon et al. |
| 2005/0210523 A1 | 9/2005 | Parnell et al. |
| 2005/0286456 A1 | 12/2005 | McNew et al. |
| 2006/0067526 A1 | 3/2006 | Faccin et al. |
| 2006/0109113 A1 | 5/2006 | Reyes et al. |
| 2006/0114928 A1 | 6/2006 | Utsunomiya et al. |
| 2006/0142034 A1 | 6/2006 | Wentink et al. |
| 2006/0153230 A1 | 7/2006 | Miyata et al. |
| 2006/0221901 A1 | 10/2006 | Yaqub et al. |
| 2006/0245373 A1 | 11/2006 | Bajic |
| 2006/0264245 A1 | 11/2006 | Luo |
| 2007/0025297 A1 | 2/2007 | Lee et al. |
| 2007/0041344 A1 | 2/2007 | Yaqub et al. |
| 2007/0064655 A1 | 3/2007 | Ruuska |
| 2007/0064660 A1 | 3/2007 | Qi et al. |
| 2007/0086359 A1 | 4/2007 | Yaqub |
| 2007/0110018 A1 | 5/2007 | Delaney et al. |
| 2007/0110092 A1 | 5/2007 | Kangude et al. |
| 2007/0124592 A1 | 5/2007 | Oyama |
| 2007/0153732 A1 | 7/2007 | Yao |
| 2007/0230389 A1 | 10/2007 | Amann et al. |
| 2007/0230423 A1 | 10/2007 | Yoshida et al. |
| 2007/0243888 A1 | 10/2007 | Faccin |
| 2007/0297438 A1 | 12/2007 | Meylan et al. |
| 2008/0031212 A1 | 2/2008 | Ogura |
| 2008/0049761 A1 | 2/2008 | Lin et al. |
| 2008/0057992 A1 | 3/2008 | Griffin |
| 2008/0095048 A1 | 4/2008 | Zhong |
| 2008/0096580 A1 | 4/2008 | Montemurro |
| 2008/0101231 A1 | 5/2008 | Lai et al. |
| 2008/0114857 A1 | 5/2008 | Snider |
| 2008/0123607 A1 | 5/2008 | Jokela |
| 2008/0141031 A1 | 6/2008 | Oba et al. |
| 2008/0151796 A1 | 6/2008 | Jokela |
| 2008/0178277 A1 | 7/2008 | Oba et al. |
| 2008/0186962 A1 | 8/2008 | Sinha |
| 2008/0261574 A1 | 10/2008 | Rinta-Aho et al. |
| 2008/0270534 A1 | 10/2008 | Xia et al. |
| 2008/0276303 A1 | 11/2008 | Gast |
| 2008/0298333 A1 | 12/2008 | Seok |
| 2009/0010399 A1 | 1/2009 | Kim et al. |
| 2009/0031138 A1 | 1/2009 | Nakhjiri |
| 2009/0046657 A1 | 2/2009 | Kim et al. |
| 2009/0047922 A1 | 2/2009 | Buckley et al. |
| 2009/0047974 A1 | 2/2009 | Quinn |
| 2009/0067326 A1 | 3/2009 | Perrot et al. |
| 2009/0067397 A1 | 3/2009 | Seok |
| 2009/0116647 A1 | 5/2009 | Korus et al. |
| 2009/0156213 A1 | 6/2009 | Spinelli et al. |
| 2009/0177759 A1 | 7/2009 | Ogawa et al. |
| 2009/0245184 A1 | 10/2009 | Torres et al. |
| 2009/0247111 A1 | 10/2009 | Sennett et al. |
| 2009/0252165 A1 | 10/2009 | Zhang et al. |
| 2009/0296688 A1 | 12/2009 | Bakker et al. |
| 2009/0296689 A1 | 12/2009 | Bakker et al. |
| 2009/0298458 A1 | 12/2009 | Bakker et al. |
| 2009/0310692 A1 | 12/2009 | Kafle et al. |
| 2009/0325566 A1 | 12/2009 | Bell et al. |
| 2010/0118831 A1 | 5/2010 | Chen et al. |
| 2010/0146272 A1 | 6/2010 | Centonza et al. |
| 2010/0169953 A1 | 7/2010 | Hofer et al. |
| 2010/0190498 A1 | 7/2010 | Ha et al. |
| 2010/0216434 A1 | 8/2010 | Marcellino et al. |
| 2010/0255864 A1 | 10/2010 | Alfano et al. |
| 2010/0271978 A1 | 10/2010 | Gupta et al. |
| 2010/0275249 A1 | 10/2010 | McCann et al. |
| 2010/0279684 A1 | 11/2010 | Salkintzis |
| 2010/0293293 A1 | 11/2010 | Beser |
| 2010/0325714 A1 | 12/2010 | Iyer et al. |
| 2011/0019653 A1 | 1/2011 | Seok |
| 2011/0028093 A1 | 2/2011 | Patel et al. |
| 2011/0040969 A1 | 2/2011 | Yao et al. |
| 2011/0047382 A1 | 2/2011 | Wang et al. |
| 2011/0055218 A1 | 3/2011 | Capuozzo et al. |
| 2011/0072101 A1 | 3/2011 | Forssell et al. |
| 2011/0103232 A1 | 5/2011 | Sood |
| 2011/0113252 A1 | 5/2011 | Krischer et al. |
| 2011/0149806 A1 | 6/2011 | Verma et al. |
| 2011/0149938 A1 | 6/2011 | Bajko |
| 2011/0154018 A1 | 6/2011 | Edstrom et al. |
| 2011/0162060 A1 | 6/2011 | Vijayakumar et al. |
| 2011/0216743 A1 | 6/2011 | Bachmann et al. |
| 2011/0188391 A1 | 8/2011 | Sella et al. |
| 2011/0274082 A1 | 11/2011 | Calhoun et al. |
| 2011/0280227 A1 | 11/2011 | McCann et al. |
| 2011/0286405 A1 | 11/2011 | Kim et al. |
| 2012/0008605 A2 | 1/2012 | Montemurro et al. |
| 2012/0017267 A1 | 1/2012 | McCann et al. |
| 2012/0054106 A1 | 3/2012 | Stephenson et al. |

(56) References Cited

U.S. PATENT DOCUMENTS

| | | |
|---|---|---|
| 2012/0057568 A1 | 3/2012 | Lim et al. |
| 2012/0076117 A1 | 3/2012 | Montemurro et al. |
| 2012/0076118 A1 | 3/2012 | Montemurro et al. |
| 2012/0099476 A1 | 4/2012 | Mahaffy et al. |
| 2012/0106514 A1 | 5/2012 | Zheng et al. |
| 2012/0116886 A1 | 5/2012 | Manku |
| 2012/0134349 A1 | 5/2012 | Jung et al. |
| 2012/0165056 A1 | 6/2012 | Kim et al. |
| 2012/0182970 A1 | 7/2012 | Ding et al. |
| 2012/0191780 A1 | 7/2012 | Sato et al. |
| 2012/0218918 A1 | 8/2012 | Takae et al. |
| 2012/0230308 A1 | 9/2012 | Saito et al. |
| 2012/0239755 A1 | 9/2012 | Filgueiras et al. |
| 2012/0243524 A1 | 9/2012 | Verma et al. |
| 2012/0244902 A1 | 9/2012 | Saito et al. |
| 2012/0246468 A1 | 9/2012 | Gabor |
| 2012/0281609 A1 | 11/2012 | Kasslin et al. |
| 2012/0296986 A1 | 11/2012 | Hassan et al. |
| 2013/0012260 A1 | 1/2013 | Salkintzis et al. |
| 2013/0028245 A1 | 1/2013 | Oerton et al. |
| 2013/0034023 A1 | 2/2013 | Jung |
| 2013/0039275 A1 | 2/2013 | Patil et al. |
| 2013/0051303 A1 | 2/2013 | Huang et al. |
| 2013/0064175 A1 | 3/2013 | Pandey et al. |
| 2013/0065627 A1 | 3/2013 | Jung et al. |
| 2013/0065633 A1 | 3/2013 | Sridhara et al. |
| 2013/0066936 A1 | 3/2013 | Krishnan et al. |
| 2013/0070738 A1 | 3/2013 | McCann et al. |
| 2013/0070739 A1 | 3/2013 | McCann et al. |
| 2013/0072248 A1 | 3/2013 | Bajko |
| 2013/0109313 A1 | 5/2013 | Kneckt et al. |
| 2013/0109314 A1 | 5/2013 | Kneckt et al. |
| 2013/0208582 A1 | 5/2013 | Wijnands et al. |
| 2013/0148643 A1 | 6/2013 | Abraham et al. |
| 2013/0166759 A1 | 6/2013 | Rajamani et al. |
| 2013/0170351 A1 | 7/2013 | Reznik et al. |
| 2013/0176897 A1 | 7/2013 | Wang et al. |
| 2013/0177002 A1 | 7/2013 | Sun et al. |
| 2013/0227152 A1 | 8/2013 | Lee et al. |
| 2013/0231151 A1 | 9/2013 | Kneckt et al. |
| 2013/0259034 A1 | 10/2013 | Klein et al. |
| 2013/0259038 A1 | 10/2013 | Anantharam et al. |
| 2013/0259040 A1 | 10/2013 | Anantharam et al. |
| 2013/0262850 A1 | 10/2013 | Canpolat et al. |
| 2013/0276076 A1 | 10/2013 | Gupta et al. |
| 2013/0281056 A1 | 10/2013 | Abraham et al. |
| 2013/0282793 A1 | 10/2013 | Swings et al. |
| 2013/0316705 A1 | 11/2013 | Kneckt et al. |
| 2013/0339478 A1 | 12/2013 | Edge et al. |
| 2014/0018037 A1 | 1/2014 | Shanmugavadivel et al. |
| 2014/0050167 A1 | 2/2014 | Smedman et al. |
| 2014/0050209 A1 | 2/2014 | Bajko et al. |
| 2014/0073356 A1 | 3/2014 | Siomina et al. |
| 2014/0078935 A1 | 3/2014 | Sun |
| 2014/0086134 A1 | 3/2014 | Smadi et al. |
| 2014/0091987 A1 | 4/2014 | Lee et al. |
| 2014/0101441 A1 | 4/2014 | Edstrom et al. |
| 2014/0164763 A1 | 6/2014 | Cherian et al. |
| 2014/0242985 A1 | 8/2014 | Kneckt et al. |
| 2014/0293978 A1 | 10/2014 | Yang et al. |
| 2015/0131641 A1 | 5/2015 | Ong et al. |
| 2015/0248702 A1 | 9/2015 | Chatterton |
| 2015/0373765 A1 | 12/2015 | Lee et al. |
| 2017/0318018 A1 | 11/2017 | Huang et al. |
| 2019/0159114 A1 | 5/2019 | McCann et al. |
| 2020/0329421 A1 | 10/2020 | McCann et al. |
| 2021/0037374 A1 | 2/2021 | Montemurro et al. |
| 2021/0136630 A1 | 5/2021 | Montemurro et al. |
| 2022/0322153 A1 | 10/2022 | McCann et al. |
| 2022/0369209 A1 | 11/2022 | McCann et al. |

FOREIGN PATENT DOCUMENTS

| | | |
|---|---|---|
| CN | 101141259 A | 3/2008 |
| CN | 101142788 A | 3/2008 |
| CN | 101150442 A | 3/2008 |
| CN | 101222388 A | 7/2008 |
| CN | 101317384 A | 12/2008 |
| CN | 101379801 A | 3/2009 |
| CN | 101395949 A | 3/2009 |
| CN | 101583151 A | 11/2009 |
| CN | 101682539 A | 3/2010 |
| CN | 101779417 A | 7/2010 |
| CN | 102100111 A | 6/2011 |
| CN | 102209303 A | 10/2011 |
| EP | 1919154 A1 | 5/2008 |
| EP | 1921818 A2 | 5/2008 |
| EP | 2076090 A1 | 7/2009 |
| EP | 2093967 A2 | 8/2009 |
| EP | 2445242 A1 | 4/2012 |
| EP | 2661122 A2 | 11/2013 |
| JP | 2002314546 A | 10/2002 |
| JP | 2004186753 A | 7/2004 |
| JP | 2008537657 A | 9/2008 |
| JP | 2008544588 A | 12/2008 |
| TW | 200947966 A1 | 11/2009 |
| WO | 0245456 A1 | 6/2002 |
| WO | 03092218 A1 | 11/2003 |
| WO | 2007082007 A2 | 7/2007 |
| WO | 2007083824 A1 | 7/2007 |
| WO | 2007103055 A2 | 9/2007 |
| WO | 2007116337 A2 | 10/2007 |
| WO | 2008049213 A1 | 5/2008 |
| WO | 2008049214 A1 | 5/2008 |
| WO | 2008107306 A1 | 9/2008 |
| WO | 2009063093 A2 | 5/2009 |
| WO | 2009101861 A1 | 8/2009 |
| WO | 2011056307 A2 | 5/2011 |
| WO | 2011073516 A1 | 6/2011 |
| WO | 2011115449 A2 | 9/2011 |
| WO | 2011132174 A1 | 10/2011 |
| WO | 2012060611 A2 | 5/2012 |
| WO | 2012091421 A2 | 7/2012 |

OTHER PUBLICATIONS

McCann, Stephen; "Emergency URN Information"; IEEE 802.11-10/0026r0; Jan. 18, 2010; 6 pages.

Rosen, B., et al.; "Framework for Emergency Calling using Internet Multimedia"; draft-ietf-ecrit-framework-10; Jul. 27, 2009; 74 pages.

Schulzrinne, H., et al.; "Extensions to the Emergency Services Architecture for dealing with Unauthenticated and Unauthorized Devices"; draft-ietf-ecrit-unauthenticated-access-06.txt; Apr. 30, 2013; 38 pages.

"IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications"; IEEE Computer Society; IEEE Std 802.11e; Nov. 11, 2005; 211 pages.

Li, Wei, et al.; "A Reliable Active Scanning Scheme for the IEEE 802.11 MAC Layer Handoff"; IEEE; 2003; 4 pages.

Montemurro, Michael; "TGae Requirements and Use Cases"; IEEE 802.11-10/0093r5; Jan. 21, 2010; 6 pages.

Bajko, Gabor; "Tutorial on Location and Emergency Services"; Nokia; Sep. 10, 2008; 45 pages.

"IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications"; IEEE Computer Society; IEEE Draft P802.11-REVmb/D9.2; Jul. 2011; 2778 pages; (Part 1: pp. 1-1369).

"IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications"; IEEE Computer Society; IEEE Draft P802.11-REVmb/D9.2; Jul. 2011; 2778 pages; (Part 2: pp. 1370-2778).

"IEEE Standard for Information Technology—Telecommunications and Information Exchange between Systems—Local and Metro-

(56) References Cited

OTHER PUBLICATIONS politan Area Networks—Specific Requirements—Part 11: Wireless LAN Medium Access Control (MAC) and Physical Layer (PHY) Specifications"; IEEE Computer Society; IEEE Std 802.11u; Feb. 25, 2011; 208 pages.
"IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications"; IEEE Computer Society; IEEE Std 802.11k; Jun. 12, 2008; 244 pages.
"IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications"; IEEE Computer Society; IEEE Std 802.11; Mar. 29, 2012; 2793 pages.
Lin, Chen-Han, et al.; "Mobile Intelligent Agent Technologies to Support Intelligent Handover Strategy"; Proceedings of the Workshop on Wireless, Ad Hoc and Sensor Network; vol. 1; 2005; 8 pages.
"Wi-Fi Peer-to-Peer (P2P) Technical Specification"; Draft Version 1.14; Wi-Fi Alliance Technical Committee P2P Task Group; Jun. 25, 2010; 22 pages.
"Draft Standard for Local and Metropolitan Area Networks: Media Independent Handover Services"; IEEE P802.21/D8.0; Dec. 2007; 343 pages.
Barber, Phillip, et al.; "GAS Version Control in 11ai"; Document: IEEE 802.11-11/1498-01-00ai; Oct. 24, 2011; 16 pages.
Office Action dated Feb. 15, 2023; U.S. Appl. No. 17/843,656, filed Jun. 17, 2022; 86 pages.
Final Office Action dated Jan. 3, 2017; U.S. Appl. No. 14/298,289, filed Jun. 6, 2014; 13 pages.
Office Action dated Mar. 30, 2017; U.S. Appl. No. 14/298,289, filed Jun. 6, 2014; 7 pages.
Notice of Allowance dated Jun. 14, 2017; U.S. Appl. No. 14/298,289, filed Jun. 6, 2014; 8 pages.
Office Action dated Jul. 11, 2013; U.S. Appl. No. 13/407,444, filed Feb. 28, 2012; 14 pages.
Office Action dated Dec. 31, 2013; U.S. Appl. No. 13/407,444, filed Feb. 28, 2012; 11 pages.
Final Office Action dated Jun. 3, 2014; U.S. Appl. No. 13/407,444, filed Feb. 28, 2012; 11 pages.
Notice of Allowance dated Sep. 17, 2014; U.S. Appl. No. 13/407,444, filed Feb. 28, 2012; 5 pages.
Office Action dated Feb. 4, 2014; U.S. Appl. No. 13/548,864, filed Jul. 13, 2012; 15 pages.
Final Office Action dated Jul. 11, 2014; U.S. Appl. No. 13/548,864, filed Jul. 13, 2012; 10 pages.
Office Action dated Oct. 30, 2014; U.S. Appl. No. 13/548,864, filed Jul. 13, 2012; 10 pages.
Notice of Allowance dated May 1, 2015; U.S. Appl. No. 13/548,864, filed Jul. 13, 2012; 14 pages.
Office Action dated Jan. 14, 2014; U.S. Appl. No. 13/469,618, filed May 11, 2012; 28 pages.
Final Office Action dated Jul. 9, 2014; U.S. Appl. No. 13/469,618, filed May 11, 2012; 31 pages.
Office Action dated Jan. 21, 2015; U.S. Appl. No. 13/469,618, filed May 11, 2012; 26 pages.
Notice of Allowance Jul. 23, 2015; U.S. Appl. No. 13/469,618, filed May 11, 2012; 15 pages.
Office Action dated Dec. 31, 2014; U.S. Appl. No. 13/547,880, filed Jul. 12, 2012; 19 pages.
Final Office Action dated Aug. 27, 2015; U.S. Appl. No. 13/547,880, filed Jul. 12, 2012; 26 pages.
Advisory Action dated Dec. 2, 2015; U.S. Appl. No. 13/547,880, filed Jul. 12, 2012; 3 pages.
Advisory Action dated Jan. 20, 2016; U.S. Appl. No. 13/547,880, filed Jul. 12, 2012; 4 pages.
Office Action dated Jun. 13, 2016; U.S. Appl. No. 13/547,880, filed Jul. 12, 2012; 58 pages.
Final Office Action dated Dec. 14, 2016; U.S. Appl. No. 13/547,880, filed Jul. 12, 2012; 33 pages.
Advisory Action dated Mar. 13, 2017; U.S. Appl. No. 13/547,880, filed Jul. 12, 2012; 11 pages.
Office Action dated Mar. 28, 2017; U.S. Appl. No. 13/547,880, filed Jul. 12, 2012; 24 pages.
Final Office Action dated Dec. 8, 2017; U.S. Appl. No. 13/547,880, filed Jul. 12, 2012; 36 pages.
Office Action dated Jun. 13, 2018; U.S. Appl. No. 13/547,880, filed Jul. 12, 2012; 39 pages.
Final Office Action dated Oct. 18, 2018; U.S. Appl. No. 13/547,880, filed Jul. 12, 2012; 32 pages.
Advisory Action dated Jan. 29, 2019; U.S. Appl. No. 13/547,880, filed Jul. 12, 2012; 4 pages.
Office Action dated Apr. 5, 2019; U.S. Appl. No. 13/547,880, filed Jul. 12, 2012; 34 pages.
Final Office Action dated Oct. 18, 2019; U.S. Appl. No. 13/547,880, filed Jul. 12, 2012; 40 pages.
Advisory Action dated Jan. 7, 2020; U.S. Appl. No. 13/547,880, filed Jul. 12, 2012; 11 pages.
Office Action dated Mar. 25, 2020; U.S. Appl. No. 13/547,880, filed Jul. 12, 2012; 36 pages.
Notice of Allowance dated Jun. 17, 2020; U.S. Appl. No. 13/547,880, filed Jul. 12, 2012; 9 pages.
Office Action dated Jun. 30, 2015; U.S. Appl. No. 13/836,759, filed Mar. 15, 2013; 24 pages.
Notice of Allowance dated Nov. 18, 2015; U.S. Appl. No. 13/836,759, filed Mar. 15, 2013; 33 pages.
Office Action dated Mar. 31, 2016; U.S. Appl. No. 14/854,685, filed Sep. 15, 2015; 56 pages.
Final Office Action dated Sep. 16, 2016; U.S. Appl. No. 14/854,685, filed Sep. 15, 2015; 18 pages.
Notice of Allowance dated Nov. 23, 2016; U.S. Appl. No. 14/854,685, filed Sep. 15, 2015; 13 pages.
Office Action dated Apr. 8, 2016; U.S. Appl. No. 14/952,574, filed Nov. 25, 2015; 75 pages.
Final Office Action dated Oct. 20, 2016; U.S. Appl. No. 14/952,574, filed Nov. 25, 2015; 36 pages.
Advisory Action dated Jan. 11, 2017; U.S. Appl. No. 14/952,574, filed Nov. 25, 2015; 2 pages.
Office Action dated Feb. 15, 2017; U.S. Appl. No. 14/952,574, filed Nov. 25, 2015; 28 pages.
Notice of Allowance dated Jun. 30, 2017; U.S. Appl. No. 14/952,574, filed Nov. 25, 2015; 24 pages.
Office Action dated Aug. 11, 2017; U.S. Appl. No. 15/048,669, filed Feb. 19, 2016; 37 pages.
Notice of Allowance dated Dec. 8, 2017; U.S. Appl. No. 15/048,669, filed Feb. 19, 2016; 10 pages.
Office Action dated Nov. 16, 2018; U.S. Appl. No. 15/460,991, filed Mar. 16, 2017; 94 pages.
Notice of Allowance dated Mar. 11, 2019; U.S. Appl. No. 15/460,991, filed Mar. 16, 2017; 12 pages.
Office Action dated Feb. 22, 2018; U.S. Appl. No. 15/483,759, filed Apr. 10, 2017; 68 pages.
Notice of Allowance dated Jul. 18, 2018; U.S. Appl. No. 15/483,759, filed Apr. 10, 2017; 13 pages.
Office Action dated Sep. 11, 2018; U.S. Appl. No. 15/785,121, filed Oct. 16, 2017; 59 pages.
Notice of Allowance dated Nov. 30, 2018; U.S. Appl. No. 15/785,121, filed Oct. 16, 2017; 7 pages.
Notice of Allowance dated Feb. 23, 2022; U.S. Appl. No. 17/146,189, filed Jan. 11, 2021; 19 pages.
Chinese Office Action; Application No. 201910799303.7; Jan. 26, 2022; 23 pages.
Bumiller, George; "Notes on Interworking with External Networks"; Document: IEEE 802.11-09/1272r2; Jul. 22, 2010; 156 pages.
Cao, Z., et al.; "DHCPv4 and DHCPv6 Options for Access Network Query Protocol Servers"; draft-cao-dhc-anqp-option-00; Jul. 9, 2012; 8 pages.

(56) References Cited

OTHER PUBLICATIONS

Kneckt, Jarkko, et al.; "Active Scanning Enabling FILS"; IEEE 802.11-11/1619r1; Jan. 16, 2012; 15 pages.
Campbell, Andrew T., et al.; "Design, Implementation, and Evaluation of Cellular IP"; IEEE Personal Communications; Aug. 2000; 8 pages.
Nakano, Hiroki; "Upper Layer Data on Management Frames"; IEEE 802.11-11/1003r1; Jul. 18, 2011; 17 pages.
Bajko, Gabor; "IP Address Configuration During Association"; IEEE P802.11; Jul. 20, 2011; 5 pages.
Wi-Fi Alliance; "Wi-Fi Peer-to-Peer (P2P) Technical Specification"; Version 1.2; 2010; 159 pages.
Wi-Fi Alliance; "Wi-Fi Peer-to-Peer (P2P) Technical Specification"; Version 1.1; 2010; 159 pages.
Frikha, Mounir, et al.; "Micro Mobility in the IP Networks"; Telecommunication Systems; Apr. 2006; 16 pages.
"Proxy from FOLDOC"; Sep. 3, 2007; Retrieved from: http://foldoc.org/proxy on Dec. 17, 2019; 2 pages.
Georgantas, Konstantinos; "Fast Initial Authentication, a New Mechanism to Enable Fast WLAN Mobility"; Master of Thesis; MSc Communication Systems, School of ICT, Royal Institute of Technology; Stockholm, Sweden; Sep. 2011; 65 pages.
Gazis, Vangelis, et al.; "Towards the Functional Enhancement of 3GPP Networks with Reconfiguration Capacities"; Wireless Personal Communications; Jun. 2011; 28 pages.
Kempf, J., et al.; "An API for Service Location"; Request for Comments: 2614; Jun. 1999; 92 pages.
Juniper Networks; "P-CR 23.852 V1.2.0 SaMOG Layer 2 Solution"; SA WG2 Meeting #92; S2-123195; Barcelona, Spain; Jul. 9-13, 2012, 13 pages.
Wi-Fi Alliance; "Wi-Fi Certified Wi-Fi Direct"; Oct. 2010; 14 pages.
Stephenson, Dave, et al.; "Venue Type Assisted Network Selection"; IEEE 802.11-07/2494r1; Sep. 17, 2007; 11 pages.
Office Action dated Jun. 29, 2012; U.S. Appl. No. 12/780,603, filed May 14, 2010; 37 pages.
Office Action dated Jan. 2, 2013; U.S. Appl. No. 12/780,603, filed May 14, 2010; 35 pages.
Final Office Action dated Jun. 5, 2013; U.S. Appl. No. 12/780,603, filed May 14, 2010; 30 pages.
Office Action dated Dec. 17, 2013; U.S. Appl. No. 12/780,603, filed May 14, 2010; 27 pages.
Final Office Action dated Jun. 3, 2014; U.S. Appl. No. 12/780,603, filed May 14, 2010; 28 pages.
Notice of Allowance dated Sep. 2, 2014; U.S. Appl. No. 12/780,603, filed May 14, 2010; 7 pages.
Office Action dated Jun. 8, 2012; U.S. Appl. No. 12/780,709, filed May 14, 2010; 6 pages.
Office Action dated Aug. 23, 2012; U.S. Appl. No. 12/780,709, filed May 14, 2010; 13 pages.
Notice of Allowance dated Jan. 18, 2013; U.S. Appl. No. 12/780,709, filed May 14, 2010; 11 pages.
Office Action dated Apr. 3, 2012; U.S. Appl. No. 12/780,722, filed May 14, 2010; 15 pages.
Notice of Allowance dated Oct. 19, 2012; U.S. Appl. No. 12/780,722, filed May 14, 2010; 6 pages.
Notice of Allowance dated Feb. 5, 2013; U.S. Appl. No. 12/780,722, filed May 14, 2010; 6 pages.
Office Action dated May 2, 2012; U.S. Appl. No. 12/780,614, filed May 14, 2010; 5 pages.
Office Action dated Jul. 19, 2012; U.S. Appl. No. 12/780,614, filed May 14, 2010; 14 pages.
Office Action dated Nov. 16, 2012; U.S. Appl. No. 12/780,614, filed May 14, 2010; 6 pages.
Office Action dated Mar. 25, 2013; U.S. Appl. No. 12/780,614, filed May 14, 2010; 10 pages.
Final Office Action dated Jul. 19, 2013; U.S. Appl. No. 12/780,614, filed May 14, 2010; 7 pages.
Notice of Allowance dated Oct. 31, 2013; U.S. Appl. No. 12/780,614, filed May 14, 2010; 7 pages.
Office Action dated Nov. 16, 2012; U.S. Appl. No. 13/045,622, filed Mar. 11, 2011; 19 pages.
Final Office Action dated Jul. 12, 2013; U.S. Appl. No. 13/045,622, filed Mar. 11, 2011; 17 pages.
Office Action dated Oct. 11, 2012; U.S. Appl. No. 13/045,658, filed Mar. 11, 2011; 11 pages.
Final Office Action dated May 15, 2013; U.S. Appl. No. 13/045,658, filed Mar. 11, 2011; 11 pages.
Advisory Action dated Jul. 26, 2013; U.S. Appl. No. 13/045,658, filed Mar. 11, 2011; 3 pages.
Office Action dated Sep. 23, 2016; U.S. Appl. No. 13/045,658, filed Mar. 11, 2011; 77 pages.
Notice of Allowance dated Nov. 18, 2016; U.S. Appl. No. 13/045,658, filed Mar. 11, 2011; 7 pages.
Office Action dated Jul. 12, 2013; U.S. Appl. No. 13/234,799, filed Sep. 16, 2011; 16 pages.
Notice of Allowance dated Jan. 30, 2014; U.S. Appl. No. 13/234,799, filed Sep. 16, 2011; 7 pages.
Office Action dated Apr. 20, 2015; U.S. Appl. No. 14/298,289, filed Jun. 6, 2014; 10 pages.
Final Office Action dated Aug. 5, 2015; U.S. Appl. No. 14/298,289, filed Jun. 6, 2014; 34 pages.
Advisory Action dated Oct. 15, 2015; U.S. Appl. No. 14/298,289, filed Jun. 6, 2014; 3 pages.
Office Action dated Nov. 16, 2015; U.S. Appl. No. 14/298,289, filed Jun. 6, 2014; 13 pages.
Final Office Action dated Mar. 21, 2016; U.S. Appl. No. 14/298,289, filed Jun. 6, 2014; 21 pages.
Advisory Action dated Jun. 8, 2016; U.S. Appl. No. 14/298,289, filed Jun. 6, 2014; 4 pages.
Office Action dated Aug. 23, 2016; U.S. Appl. No. 14/298,289, filed Jun. 6, 2014; 8 pages.
Final Office Action dated Aug. 17, 2023; U.S. Appl. No. 17/843,656, filed Jun. 17, 2022; 13 pages.
Notice of Allowance dated Aug. 28, 2023; U.S. Appl. No. 17/877,045, filed Jul. 29, 2022; 9 pages.
European Extended Search Report; Application No. 12847065.5; Jul. 13, 2015; 11 pages.
European Examination Report; Application No. 12847065.5; Oct. 12, 2018; 6 pages.
Korean Office Action; Application No. 10-2014-7015745; Apr. 29, 2015; 11 pages.
European Extended Search Report; Application No. 19191611.3; Sep. 9, 2019; 14 pages.
European Examination Report; Application No. 19191611.3; Jul. 23, 2021; 7 pages.
Chinese Office Action; Application No. 201910799303.7; Jan. 19, 2021; 18 pages.
Chinese Office Action; Application No. 201910799303.7; Aug. 20, 2021; 24 pages.
Taiwan Search Report; Application No. 102124777; Dec. 9, 2014; 1 page.
PCT International Search Report; Application No. PCT/CA2013/050540; Sep. 17, 2013; 3 pages.
PCT Written Opinion of the International Searching Authority; Application No. PCT/CA2013/050540; Sep. 17, 2013; 3 pages.
Canadian Office Action; Application No. 2,878,980; Feb. 19, 2019; 3 pages.
European Extended Search Report; Application No. 13816111.2; Feb. 3, 2016; 7 pages.
European Examination Report; Application No. 13816111.2; Mar. 29, 2017; 4 pages.
European Examination Report; Application No. 13816111.2; Dec. 4, 2017; 6 pages.
European Examination Report; Application No. 13816111.2; May 14, 2018; 4 pages.
European Summons to Attend Oral Proceedings; Application No. 13816111.2; Jan. 21, 2019; 6 pages.
European Extended Search Report; Application No. 18166755.1; Aug. 22, 2018; 6 pages.
European Examination Report; Application No. 18166755.1; Jul. 31, 2019; 4 pages.

(56) References Cited

OTHER PUBLICATIONS

European Summons to Attend Oral Proceedings; Application No. 18166755.1; Jan. 7, 2020; 7 pages.
European Brief Communication; Application No. 18166755.1; Apr. 23, 2020; 5 pages.
European Extended Search Report; Application No. 19172928.4; Jul. 19, 2019; 7 pages.
European Examination Report; Application No. 19172928.4; Dec. 21, 2020; 5 pages.
Taiwan Office Action; Application No. 102116774; Oct. 27, 2014; 16 pages.
Taiwan Office Action; Application No. 102116774; Jun. 12, 2015; 16 pages.
PCT International Search Report; Application No. PCT/CA2013/050362; Aug. 2, 2013; 4 pages.
PCT Written Opinion of the International Searching Authority; Application No. PCT/CA2013/050362; Aug. 2, 2013; 5 bages.
Canadian Office Action; Application No. 2,872,882; Sep. 28, 2016; 4 pages.
Canadian Office Action; Application No. 2,872,882; Jun. 6, 2017; 3 pages.
European Extended Search Report; Application No. 13788377.3; Dec. 21, 2015; 8 pages.
European Examination Report; Application No. 13788377.3; Oct. 10, 2016; 6 pages.
European Examination Report; Application No. 13788377.3; Jun. 11, 2018; 7 pages.
European Extended Search Report; Application No. 19211911.3; Feb. 12, 2020; 12 pages.
Taiwan Search Report; Application No. 102122238; Dec. 24, 2014; 1 page.
Taiwan Search Report; Application No. 102122238; Sep. 21, 2015; 7 pages.
PCT International Search Report; PCT/CA2013/050539; Sep. 16, 2013; 3 pages.
PCT Written Opinion of the International Searching Authority; PCT/CA2013/050539; Sep. 16, 2013; 4 pages.
Canadian Office Action; Application No. 2,878,736; Mar. 6, 2019; 6 pages.
Canadian Office Action; Application No. 2,878,736; Apr. 9, 2020; 3 pages.
European Extended Search Report; Application No. 13817511.2; Feb. 12, 2016; 9 pages.
European Examination Report; Application No. 13817511.2; Mar. 8, 2017; 5 pages.
European Examination Report; Application No. 13817511.2; Oct. 24, 2017; 4 pages.
European Extended Search Report; Application No. 19154310.7; Apr. 2, 2019; 15 pages.
European Examination Report; Application No. 19154310.7; Mar. 9, 2020; 5 pages.
PCT International Search Report; Application No. PCT/CA2014/050060; Apr. 15, 2014; 3 pages.
PCT Written Opinion of the International Searching Authority; Application No. PCT/CA2014/050060; Apr. 15, 2014; 7 pages.
European Extended Examination Report; Application No. 14749467.8; Jun. 22, 2016; 8 pages.
European Examination Report; Application No. 14749467.8; Dec. 7, 2018; 7 pages.
European Examination Report; Application No. 14749467.8; Jan. 2, 2020; 4 pages.
European Extended Examination Report; Application No. 21158898.3; Jun. 8, 2021; 11 pages.
Canadian Office Action; Application No. 2,799,292; Feb. 23, 2016; 4 pages.
Chinese Office Action; Application No. 201180033260.3; Jun. 3, 2015; 21 pages.
Chinese Office Action; Application No. 201180033260.3; Jan. 20, 2016; 7 pages.
European Examination Report; Application No. 11726171.9; May 9, 2016; 8 pages.
European Examination Report; Application No. 11726171.9; Nov. 20, 2018; 5 pages.
PCT International Search Report; Application No. PCT/IB2011/001023; Oct. 14, 2011; 3 pages.
PCT Written Opinion of the International Searching Authority; Application No. PCT/IB2011/001023; Oct. 14, 2011; 5 pages.
Canadian Office Action; Application No. 2,799,295; Oct. 31, 2014; 4 pages.
Canadian Office Action; Application No. 2,799,295; Feb. 24, 2016; 4 pages.
Chinese Office Action; Application No. 201180033296.1; Dec. 31, 2014; 14 pages.
Chinese Office Action; Application No. 201180033296.1; Dec. 16, 2015; 8 pages.
European Examination Report; Application No. 11726172.7; Feb. 10, 2015; 4 pages.
PCT International Search Report; Application No. PCT/IB2011/001018; Dec. 5, 2011; 3 pages.
PCT Written Opinion of the International Searching Authority; Application No. PCT/IB2011/001018; Dec. 5, 2011; 6 pages.
Canadian Office Action; Application No. 2,799,293; Jun. 16, 2014; 2 pages.
Canadian Office Action; Application No. 2,799,293; Jul. 13, 2015; 6 pages.
Canadian Office Action; Application No. 2,799,293; Jun. 10, 2016; 5 pages.
Canadian Office Action; Application No. 2,799,293; May 17, 2017; 4 pages.
Chinese Office Action; Application No. 201180033197.3; Dec. 12, 2014; 20 pages.
Chinese Office Action; Application No. 201180033197.3; Aug. 18, 2015; 16 pages.
European Examination Report; Application No. 11733699.0; Jan. 15, 2016; 6 pages.
European Examination Report; Application No. 11733699.0; Sep. 6, 2016; 4 pages.
European Examination Report; Application No. 11733699.0; Jul. 19, 2017; 4 pages.
European Extended Search Report; Application No. 18157024.3; May 25, 2018; 10 pages.
PCT International Search Report; Application No. PCT/CA2012/050635; Dec. 10, 2012; 2 pages.
PCT Written Opinion of the International Searching Authority; Application No. PCT/CA2012/050635; Dec. 10, 2012; 7 pages.
Canadian Office Action; Application No. 2,848,754; Sep. 24, 2015; 4 pages.
Canadian Office Action; Application No. 2,848,754; Aug. 15, 2016; 5 pages.
Canadian Office Action; Application No. 2,848,754; Jul. 28, 2017; 4 pages.
Chinese Office Action; Application No. 201280044612.X; Nov. 28, 2016; 15 pages.
Chinese Office Action; Application No. 201280044612.X; Jun. 23, 2017; 10 pages.
European Extended Search Report; Application No. 12831400.2; Jul. 3, 2015; 10 pages.
European Examination Report; Application No. 12831400.2; Jun. 16, 2017; 6 pages.
European Summons to Attend Oral Proceedings; Application No. 12831400.2; May 25, 2018; 9 pages.
Korean Office Action; Application No. 10-2014-7008921; Mar. 23, 2015; 5 pages.
Korean Notice of Allowance; Application No. 10-2014-7008921; Sep. 18, 2015; 3 pages.
Chinese Office Action; Application No. 201810013191.3; Mar. 19, 2020; 13 pages.
European Extended Search Report; Application No. 19171474.0; May 23, 2019; 11 pages.
European Examination Report; Application No. 19171474.0; Jul. 22, 2020; 5 pages.

(56) References Cited

OTHER PUBLICATIONS

European Examination Report; Application No. 19171474.0; Jun. 2, 2021; 7 pages.
PCT International Search Report; Application No. PCT/CA2012/050793; Jan. 16, 2013; 3 pages.
PCT Written Opinion of the International Searching Authority; Application No. PCT/CA2012/050793; Jan. 16, 2013; 5 pages.
Canadian Office Action; Application No. 2,854,947; Aug. 9, 2018; 3 pages.
Canadian Office Action; Application No. 2,854,947; Jun. 25, 2019; 5 pages.
Chinese Office Action; Application No. 201280066681.0; Mar. 10, 2017; 21 pages.
Chinese Office Action; Application No. 201280066681.0; Sep. 11, 2017; 18 pages.
Chinese Office Action; Application No. 201280066681.0; Jan. 15, 2018; 12 pages.
Chinese Reexamination Notification as Received in Co-pending Application No. 201280066681.0 on Aug. 29, 2018; 13 pages. (No English translation available).
Chinese Reexamination Notification as Received in Co-pending Application No. 201280066681.0 on Dec. 29, 2018; 13 pages. (No English translation available).
Chinese Rejection Decision as Received in Co-pending Application No. 201280066681.0 on May 31, 2019; 20 pages. (No English translation available).
Office Action dated May 11, 2023; U.S. Appl. No. 17/877,045, filed Jul. 29, 2022; 91 pages.
Office Action dated Mar. 22, 2018; U.S. Appl. No. 15/811,259, filed Nov. 13, 2017; 70 pages.
Final Office Action dated Nov. 1, 2018; U.S. Appl. No. 15/811,259, filed Nov. 13, 2017; 18 pages.
Advisory Action dated Jan. 14, 2019; U.S. Appl. No. 15/811,259, filed Nov. 13, 2017; 2 pages.
Notice of Allowance dated Feb. 25, 2019; U.S. Appl. No. 15/811,259, filed Nov. 13, 2017; 13 pages.
Office Action dated Dec. 27, 2019; U.S. Appl. No. 16/176,467, filed Oct. 31, 2018; 92 pages.
Notice of Allowance dated Apr. 8, 2020; U.S. Appl. No. 16/176,467, filed Oct. 31, 2018; 13 pages.
Office Action dated Nov. 27, 2019; U.S. Appl. No. 16/261,131, filed Jan. 29, 2019; 78 pages.
Final Office Action dated Mar. 17, 2020; U.S. Appl. No. 16/261,131, filed Jan. 29, 2019; 12 pages.
Advisory Action dated May 19, 2020; U.S. Appl. No. 16/261,131, filed Jan. 29, 2019; 4 pages.
Office Action dated Jun. 29, 2020; U.S. Appl. No. 16/261,131, filed Jan. 29, 2019; 12 pages.
Final Office Action dated Sep. 24, 2020; U.S. Appl. No. 16/261,131, filed Jan. 29, 2019; 17 pages.
Office Action dated Feb. 12, 2021; U.S. Appl. No. 16/261,131, filed Jan. 29, 2019; 7 pages.
Notice of Allowance dated Jun. 23, 2021; U.S. Appl. No. 16/261,131, filed Jan. 29, 2019; 19 pages.
Notice of Allowance dated Sep. 3, 2020; U.S. Appl. No. 16/428,350, filed May 31, 2019; 42 pages.
Office Action dated Sep. 2, 2021; U.S. Appl. No. 16/912,249, filed Jun. 25, 2020; 90 pages.
Office Action dated Dec. 15, 2021; U.S. Appl. No. 16/912,249, filed Jun. 25, 2020; 28 pages.
Notice of Allowance dated Sep. 22, 2021; U.S. Appl. No. 17/072,957, filed Oct. 16, 2020; 97 pages.
Office Action dated Oct. 28, 2021; U.S. Appl. No. 17/146,189, filed Jan. 11, 2021; 97 pages.
PCT International Search Report; Application No. PCT/IB2011/051040; Jun. 30, 2011; 4 pages.
PCT Written Opinion of the International Searching Authority; Application No. PCT/IB2011/051040; Jun. 30, 2011; 7 pages.
Taiwan Office Action; Application No. 100108467; Aug. 9, 2013; 12 pages.
PCT International Search Report; Application No. PCT/IB2011/051044; Jun. 30, 2011; 4 pages.
PCT Written Opinion of the International Searching Authority; Application No. PCT/IB2011/051044; Jun. 30, 2011; 7 pages.
Canadian Office Action; Application No. 2,793,375; Oct. 18, 2013; 3 pages.
Canadian Office Action; Application No. 2,793,375; Jun. 25, 2014; 3 pages.
Canadian Office Action; Application No. 2,793,375; Jul. 10, 2015; 5 pages.
Canadian Office Action; Application No. 2,793,375; May 2, 2016; 6 pages.
Canadian Office Action; Application No. 2,793,375; Apr. 7, 2017; 4 pages.
Chinese Office Action; Application No. 201180023969.5; Oct. 30, 2014; 20 pages.
Chinese Office Action; Application No. 201180023969.5; Jul. 20, 2015; 10 pages.
European Examination Report; Application No. 11715273.6; Jan. 13, 2016; 6 pages.
European Examination Report; Application No. 11715273.6; Jan. 25, 2017; 4 pages.
Indian Office Action; Application No. 7976/CHENP/2012; Aug. 30, 2018; 6 pages.
Japanese Office Action; Application No. 2012-557644; Oct. 17, 2013; 5 pages.
Japanese Office Action; Application No. 2014-019062; Nov. 21, 2014; 4 pages.
PCT International Search Report; Application No. PCT/IB2010/002932; May 9, 2011; 3 pages.
PCT Written Opinion of the International Searching Authority; Application No. PCT/IB2010/002932; May 9, 2011; 6 pages.
PCT International Search Report; Application No. PCT/IB2011/001006; Aug. 3, 2011; 4 pages.
PCT Written Opinion of the International Searching Authority; Application No. PCT/IB2011/001006; Aug. 3, 2011; 9 pages.
Canadian Office Action; Application No. 2,799,291; May 28, 2014; 3 pages.
Canadian Office Action; Application No. 2,799,291; Jun. 2, 2015; 4 pages.
Chinese Office Action; Application No. 201180033223.2; Jan. 22, 2015; 15 pages.
Chinese Office Action; Application No. 201180033223.2; Oct. 10, 2015; 12 pages.
European Examination Report; Application No. 11726170.1; May 9, 2016; 8 pages.
European Examination Report; Application No. 11726170.1; Nov. 19, 2018; 6 pages.
European Extended Search Report; Application No. 19211770.3; Dec. 17, 2019; 7 pages.
PCT International Search Report; Application No. PCT/IB2011/001008; Aug. 3, 2011; 4 pages.
PCT Written Opinion of the International Searching Authority; Application No. PCT/IB2011/001008; Aug. 3, 2011; 9 pages.
Canadian Office Action; Application No. 2,799,292; May 27, 2014; 3 pages.
Canadian Office Action; Application No. 2,799,292; Jun. 8, 2015; 4 pages.
Notice of Allowance dated Mar. 30, 2022; U.S. Appl. No. 16/912,249, filed Jun. 25, 2020; 14 pages.
Notice of Allowance dated Nov. 22, 2023; U.S. Appl. No. 17/843,656, filed Jun. 17, 2022; 11 pages.
McCann, Stephen, et al.; U.S. Appl. No. 18/670,198; Filing Date: May 21, 2024; Title: Discovering Network Information Available via Wireless Networks; 64 pages.

COMMUNICATION LAYER ARCHITECTURE

Figure 7

| Information Name | Information ID | ANQP Element |
|---|---|---|
| WAN Latency | 272 | 6.1.2 |
| 3GPP Capability | 273 | 6.2.2 |
| Mobility Capability | 274 | 6.3.2 |
| Hotspot Capability | 275 | 6.4.2 |
| Neighbor AP Report | 276 | 6.5.2 |
| Device Identification | 277 | 6.6.2 |
| Multi-BSSID Information | 288 | 6.7.2 |

*IEEE 802.11 ANQP Information ID Definitions*

Figure 8

| Element Name | Subtype Value | Description |
|---|---|---|
| WAN Latency | 7 | 6.1.3 |
| 3GPP Capability | 8 | 6.2.3 |
| Mobility Capability | 9 | 6.3.3 |
| Hotspot Capability | 10 | 6.4.3 |
| Neighbor AP Report | 11 | 6.5.3 |
| Device Identification | 12 | 6.6.3 |
| Multi-BSSID Information | 13 | 6.7.3 |

*Hotspot 2.0 ANQP Element Subtype Definitions*

DISCOVERING NETWORK INFORMATION AVAILABLE VIA WIRELESS NETWORKS

CROSS-REFERENCE TO RELATED APPLICATIONS

This application is a continuation of U.S. patent application Ser. No. 16/261,131 filed Jan. 29, 2019 by Stephen McCann, et al. entitled, "Discovering Network Information Available via Wireless Networks", which is a continuation of U.S. Pat. No. 10,200,941 issued on Feb. 5, 2019 entitled, "Discovering Network Information Available via Wireless Networks", which is a continuation of U.S. Pat. No. 9,794,967, issued on Oct. 17, 2017 entitled, "Discovering Network Information Available via Wireless Networks", which is a continuation of U.S. Pat. No. 8,750,180, issued on Jun. 10, 2014 entitled, "Discovering Network Information Available via Wireless Networks", all of which are incorporated by reference herein as if reproduced in their entireties.

BACKGROUND

Wireless network deployments, such as wireless local area networks ("WLANs"), allow wireless terminals to access network and Internet services when within proximity of wireless communication signals of those wireless networks. Different networks provide different network information for wireless clients. Such network information may include access to particular subscription service provider ("SSP") networks ("SSPN"), roaming agreements to allow connections from wireless clients associated with different SSPs, authentication capabilities to enable secure communications, support for emergency services, support for particular types of multi-media access (e.g., audio and/or video streaming, downloading, etc.), or support for other types of network services. However, the network information provided may only be provided upon a connection or association with that network. Depending on the network information received, a device may need to disconnect or disassociate with that network and pursue a different network.

BRIEF DESCRIPTION OF THE DRAWINGS

FIG. 7 illustrates a table of IEEE 802.11 ANQP information identifiers;
FIG. 8 illustrates a table of Hotspot ANQP element subtype definitions.

DETAILED DESCRIPTION

Figure 1:
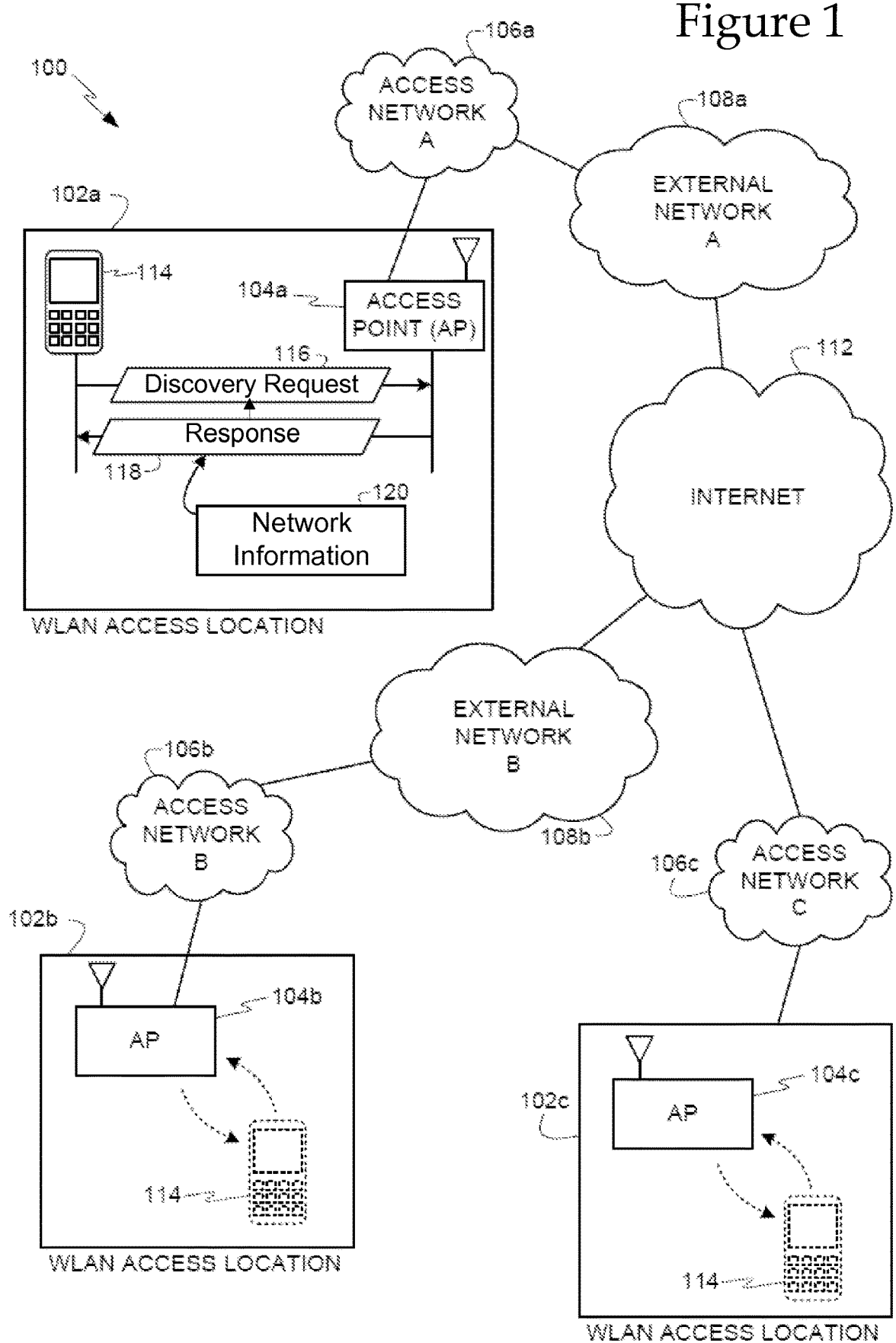
FIG. 1 illustrates a communication network.

The disclosed systems and methods retrieve discovery information about a network prior to association with that network. This pre-association communication may be retrieved through a wireless protocol, such as Access Network Query Protocol ("ANQP"), which allows a wireless device to retrieve information about a network prior to associating with that network. Communications prior to network association may be referred to discovery communications or communications in a pre-associated state. ANQP may allow a device to retrieve additional network information prior to establishing network capability (i.e., prior to the exchange of any authentication parameters between the device and the network as well prior to the establishment of a recognized session between the device and the network). The additional network information that may be discoverable prior to network association includes, for example, network latency, cellular capabilities, hotspot capabilities, mobility capabilities, neighbor reports, station identification, and multiple hotspot session identification together with other similar parameters providing network information. The network information that may be discovered prior to network association is further described with respect to FIG. 4.

Wireless devices that communicate prior to network association may include mobile communication devices, mobile computing devices, or any other device capable of communicating wirelessly with a wireless network. Such devices may also be referred to as terminals, wireless terminals, stations ("STA") or user equipment, and may also include mobile smart phones (e.g., a BlackBerry® smart phone or BlackBerry® Playbook), wireless personal digital assistants ("PDA"), machine to machine equipment, equipment within a smart grid ("SmartGrid"), equipment within a mesh network (an ad-hoc or peer network), laptop/notebook/netbook computers with wireless adapters, etc.

Some devices may discover information about the external networks (e.g., subscription service provider networks ("SSPNs")) may include a wireless local area network ("WLAN"). The network discovery and connectivity in a WLAN may occur through standards that define access, control and communications in networks, such as the communication standard known as IEEE® (Institute for Electrical and Electronics Engineers) 802.11, which, among other things, defines an amendment entitled "interworking with external networks." Alternatively, the network discovery and connectivity may be subject to other parts of the IEEE 802.11 standard and other wireless communication standards including WLAN standards including any IEEE® 802.xx standard (e.g. IEEE 802.15, IEEE 802.16, IEEE 802.19, IEEE 802.20, and IEEE 802.22), personal area network standards, wide area network standards, or cellular communication standards.

One network shown below is a WLAN. Alternatively, the devices may discover information about other networks through other protocols and architectures, including a cellular telephone network or a WiMax network. The network may comprise a publicly accessible network, such as the Internet, a private network, such as an intranet, or combinations thereof, and may utilize a variety of networking protocols now available or later developed including, but not limited to TCP/IP based networking protocols. The networks may include any communication method or employ any form of machine-readable media for communicating information from one device to another.

The discovery of network information may be implemented in many environments providing WLAN access for network connectivity or in WLAN access locations or environments in which it may be expected that one or more users carrying respective wireless terminals will associate with (i.e., join or connect to) and disassociate from a wireless network, access point, or WLAN as they enter and exit the WLAN access locations or environments. Some WLAN locations or environments may be known as "hotspots" in reference to a location or environment that is within communication range of WLAN signals. WLAN locations or environments may include coffee shops, retail stores, home locations (e.g. homes and apartments), educational facilities, office environments, airports, public transportation stations and vehicles, hotels, etc. Such WLANs are often implemented as access networks that provide access to publicly accessible networks and may be associated with, or support access to, external networks (or WLAN-supported networks) owned and/or operated by subscription-based service providers. For example, an external network can be owned and/or operated by an Internet-access service provider or a telecommunications carrier/service provider that provides subscription-based Internet access for a fee (e.g., a monthly fee). In some systems, a subscriber/user may subscribe to such a service can use wireless network access and/or Internet-access services based on such a subscription when the subscriber is in communication proximity of the WLAN with an appropriate wireless terminal. In some instances, different WLANs may provide access to different types of network information. For example, some WLANs may provide access to particular subscription service provider networks, and some WLANs may support roaming agreements to allow connections from wireless terminals associated with different SSPs.

During some network discovery processes a wireless terminal may transmit a query for certain network information from the wireless local area network ("WLAN"). The terminal may obtain network information made available by WLANs to determine, based on the network information, whether to continue with a connection process to associate with that network. In accordance with the embodiments described herein, wireless terminals may request network information from WLANs using an Access Network Query Protocol ("ANQP"). ANQP supports information retrieval from an Advertisement Server that supports a Generic Advertisement Service ("GAS"). ANQP and GAS are defined in IEEE® 802.11u™, the entire disclosure of which is incorporated by reference.

Generic Advertisement Service ("GAS") may serve as a transport mechanism, at layer-2 (see e.g. FIG. 2), for an advertisement protocol. The advertisement protocol may connect the wireless terminal to one of several interworked servers. The advertisement protocol allows the transmission of frames between a wireless terminal device and a server in the network prior to network connectivity. For example, GAS provides support for network selection by a wireless terminal as well as for communication between the wireless terminal and other information resources in the network before the wireless terminal associates with a WLAN. The wireless terminal may be connected to a layer-2 radio service, without exchanging any authentication parameters or without having a recognized session (because no session keys are established and no internet protocol address is assigned). When in compliance with the IEEE 802.11 standard, no data traffic is allowed in this state.

Other layer-2 transport mechanisms or even authentication mechanisms may be used. For example, the Extensible Authentication Protocol ("EAP") may be used to carry the advertisement protocol. The advertisement protocol information would be encapsulated within a suitable EAP-TLV (type length value) method frame (or alternative EAP method frame) and transported by the EAP. Use of secure credentials exchanged during the EAP transactions would also provide a level of security for any information carried within the advertisement protocol. For example, if EAP-SIM (or EAP-AKA) were to be the authentication protocol, any advertisement protocol information encapsulated (i.e. securely carried) within a suitable EAP-TLV frame during the same EAP transaction may also be protected by the SIM credentials.

Access Network Query Protocol ("ANQP") is an advertisement protocol and operates as a query and response protocol used by a wireless terminal to discover a range of information from a server including accessible roaming partners internet protocol address type availability, and other metadata useful in the wireless terminal's network selection process. ANQP is capable of discovering information about hotspots or wireless networks, prior to the wireless terminal establishing network connectivity and associating with that network. In addition to being defined in IEEE® 802.11u, additional ANQP messages may alternatively or additionally be defined in the Wi-Fi Alliance ("WFA") Hotspot 2.0 specifications. These ANQP extensions within the WFA Hotspot 2.0 specifications may be referred to as Hotspot ("HS") 2.0 ANQP elements. Alternatively, other advertisement protocols (e.g., Registered Location Query Protocol "RLQP" as defined in IEEE® 802.11af) may also be used. ANQP provides one embodiment for communication with a WLAN at the discovery stage without requiring an association with the network. Network information that is communicated prior to network association (or at the discovery stage) is discussed below. In alternative embodiments, other layer-2 transport mechanisms or even authentication mechanisms such as the Extensible Authentication Protocol (EAP) could be used to carry the ANQP messages. The ANQP message would be encapsulated within a suitable EAP-TLV method frame (or alternative EAP method frame) and transported by the EAP.

A network discovery exchange may involve a requesting wireless terminal to query another wireless terminal (e.g., a WLAN access point ("AP")) for network information. A WLAN AP (also referred to simply as an AP) is an entity that contains one station and provides access to distribution services via a wireless medium for associated stations. The queried or receiving terminal (e.g., an AP) may respond to the received query with the requested information in a response. The queried or receiving terminal can provide the response information with or without proxying the query to a server in an external network (e.g., a subscription service provider ("SSP") network). For example, an external network connected to a queried WLAN may have certain network information accessible via the WLAN and of which a querying wireless terminal may be made aware. The network discovery exchange or communications prior to network association may use ANQP or other query protocols too, just as information exchange services may be used alternatively.

FIG. 1 illustrates a communication network 100. Network information may be communicated during network discovery using ANQP over the communications network 100. The communication network 100 includes a plurality of WLAN access locations 102a-c having respective access points ("APs") 104a-c that provide access to respective access networks 106a-c. The APs 104a-c are further described with respect to FIG. 6. The access network A 106a provides access to an external network A 108a and the access network B 106b provides access to an external network B 108b. Unlike the access networks A 106a and B 106b that do not connect directly to the Internet 112, the access network C 110 may connect directly to a publicly accessible network like the Internet. Thus, the access network C 106c may be a public network, while the access networks A 106a and B 106b may be private networks.

In one embodiment, each of the external networks A 108*a* and B 108*b* may be a subscription service provider network ("SSPN") owned or operated by data subscription service providers, Internet subscription service providers, media (e.g., audio/video) subscription service providers, wireless communications subscription service providers, or any combination thereof. The external networks A 108*a* and B 108*b* are connected to the Internet 112 and may, for example, provide subscription-based Internet access to wireless terminal devices. In some implementations, roaming agreements between different subscription service providers may enable the external networks A 108*a* and B 108*b* to support roaming connections for wireless terminals associated with other subscription service providers.

The WLAN access location 102*a* illustrates a wireless terminal 114 in wireless range of the access point ("AP") 104*a*. The wireless terminal 114 is further described with respect to FIG. 5. The AP 104*a* connects with the access network A 106*a*, which may provide a direct or indirect connection to other networks, including publicly accessible network like the Internet 112. Prior to the wireless terminal 114 associating with the access network A 106*a*, wireless terminal 114 sends a discovery request 116 to the AP 104*a*. The AP 104*a* may respond with a discovery response 118. In alternative embodiments, the discovery request 116 may originate from the AP 104*a* and the discovery response 118 may be from the wireless terminal 114, such as with mesh, peer to peer, ad-hoc or Wi-Fi direct networks. The discovery request 116 or the discovery response 118 may include network information 120. The network information 120, also known as discovery information, network discovery information, or discovery communications, may include information about the network and/or device that is communicated between the device and the network prior to the device associating with the network. In one embodiment, the network information 120 may be communicated using the ANQP protocol. Network information 120 that may be discovered is further described with respect to FIG. 4.

The discovery communications (request 116 and response 120) may be exchanged at a media access control ("MAC") sub-layer of a data link layer of the Open Systems Interconnection ("OSI") Reference Model without needing to use operations at or above an internet protocol ("IP") layer (i.e., a network layer) and without needing to otherwise provide access to the IP layer while discovering network information 120. Discovering network information using messages exchanged at or above the network layer may require more processing power for a wireless terminal than implementing processes at the MAC sub-layer. The layers in which the discovery communication operates are further illustrated in FIG. 2.

Each of the APs 104*a-c* and the wireless terminal 114 may include a network adapter or network interface card that facilitates connections to a wireless medium. The network interface component may be referred to as a station ("STA"). Each of the access networks 106*a-c* and the external networks 108*a-b* may be associated with and/or provide access to different network information. The network information may include discovery information that is provided by a network prior to the association with that network. The network information may be set by respective owners or operators of the networks 106*a-c*, 108*a*, and 108*b* based on different factors such as, for example, subscription usage plans, desired security levels, business objectives, roaming agreements, supported emergency services, supported multimedia access, available Internet access, etc.

The wireless terminal 114 may associate with different APs (e.g., the APs 104*a-c*) based at least partially on the network information 120 received regarding the available external networks. The wireless terminal 114 may receive information from the APs when moved in range of one of the WLAN access locations 102*a-c*, respectively. The wireless terminal 114 can dynamically discover network information available at any of the WLAN access locations 102*a-c* and may process that information when electing whether to associate with one of the APs 104*a-c*.

Figure 2:
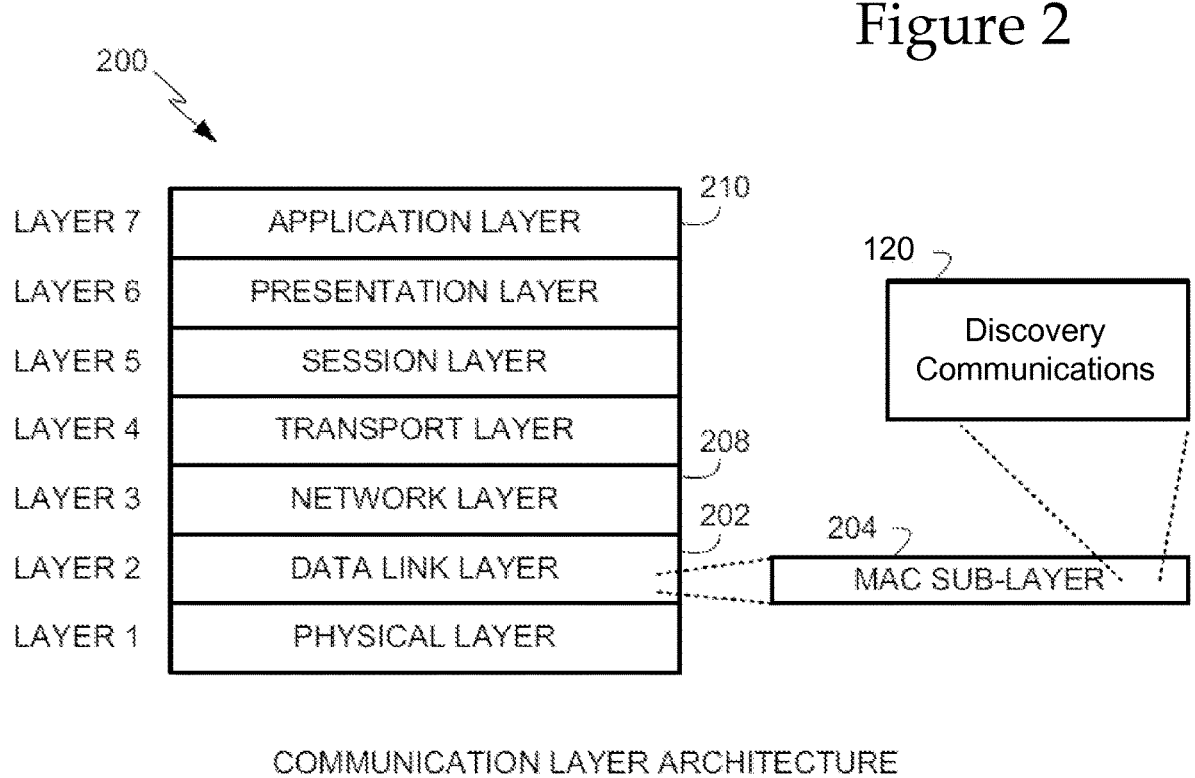
FIG. 2 illustrates a communication layer architecture.

FIG. 2 illustrates a communication layer architecture 200. The communication layer architecture 200 includes seven layers which may be implemented in accordance with the Open Systems Interconnection ("OSI") Reference Model. The communication layer architecture 200 includes a data link layer 202, which includes a media access control ("MAC") sub-layer 204. Wireless terminal devices (e.g., the wireless terminal 114 of FIG. 1) may provide network information or discovery communications 120 (e.g. the discovery request 116 and the discovery response 118) with wireless access points (e.g., the wireless access points 102*a-c* of FIG. 1) at the MAC sub-layer 204. A wireless terminal device may access information from a memory or other hardware of the wireless terminal at the MAC sub-layer 204 without needing to perform operations at or above an internet protocol layer (e.g., a network layer 208) and without needing to provide access to the internet protocol layer. Mobile wireless terminal devices (e.g., the wireless terminal 114 of FIG. 1) that include mobile smart phones, PDA's, processor based devices, etc. may have relatively limited processor cycles and less available electrical power than fixed-location computing devices powered using wired (e.g. alternating current) electricity sources. Low-level resource operations at the MAC sub-layer require relatively fewer system resources than user-interface-intensive and operating system intensive operations (e.g., web-browser operations) at an application layer.

Discovering network information available via access points using the MAC sub-layer may be used for identifying suitable connections between a wireless terminal and an access point. This connection may occur without user involvement or with minimal user involvement. The network information 120 may indicate whether a particular network (e.g., a SSPN) would be suitable to associate with. For example, the network information 120 may include WAN latency information. The wireless terminal 114 may require a minimum latency before associating with a particular network. Making this determination prior to an association with the network may substantially reduce or eliminate user frustration because the user would not need to engage in any attempts to associate with or connect to a particular access point when the access point or network does not meet the particular network capability requirements of the wireless terminal 114, thereby substantially enhancing the user experience. Communicating such attributes or characteristics prior to a persistent or non-continuous network connection may improve network bandwidth while reducing user frustration. With fewer users attempting connections (e.g., session access) network throughput may increase for those serviced by the network. Moreover, those users that cannot sustain or maintain a connection may avoid the challenges of initiating or establishing such a connection.

Some communications or authentication techniques that use hypertext transfer protocol ("HTTP") or other internet protocol processes may require establishing a connection between a wireless terminal and a wireless access point at one or more of the layers between and including the network layer 208 and an application layer 210 of the communication layer architecture 200. In these applications, discovery communications 120 may not require a connection or access to the network layer 208 or any layers within a protocol suite. An inclusion of a discovery communication 120 on the MAC sub-layer 204 may allow for a wireless terminal to communicate with a network without associating with the network.

Figure 3:
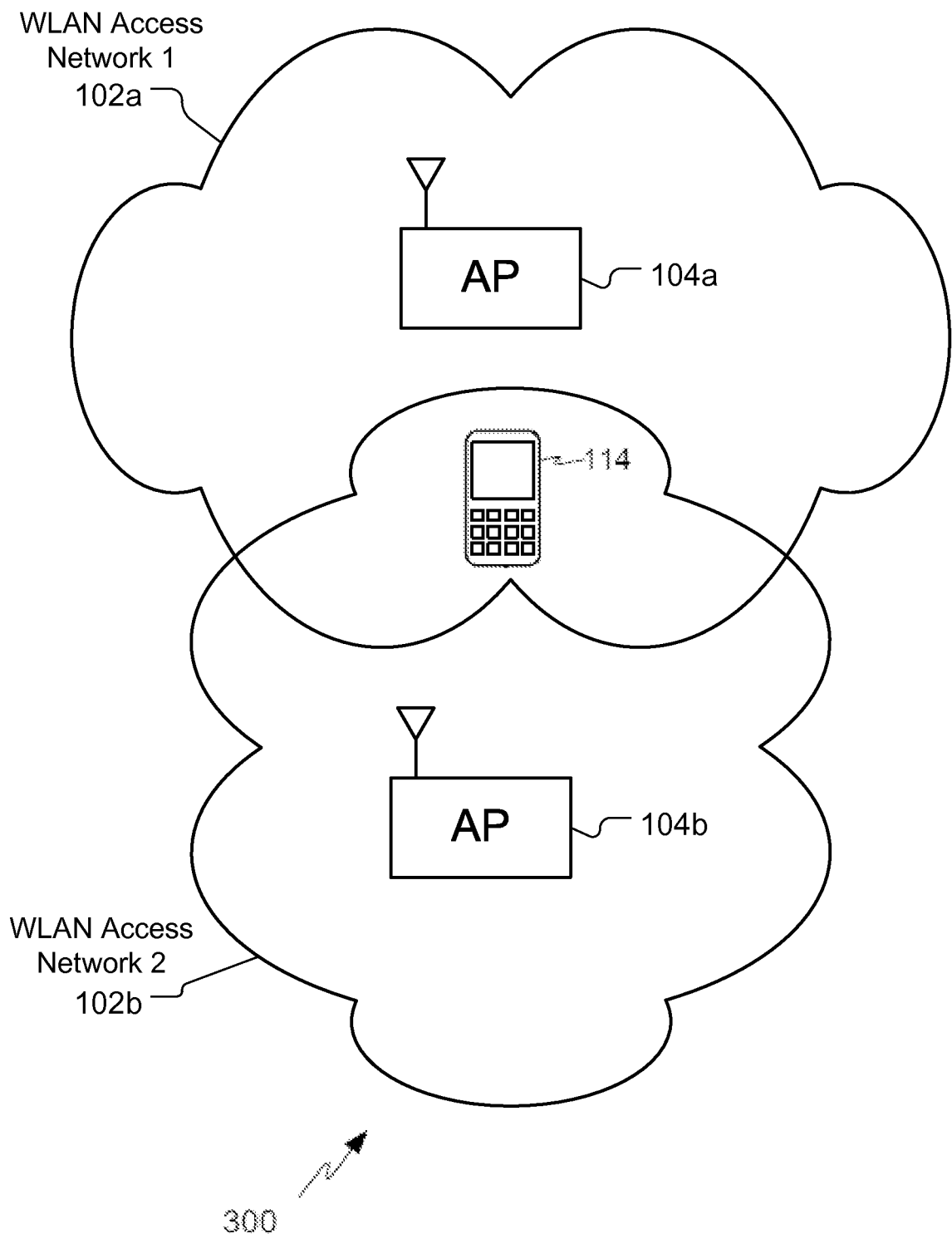
FIG. 3 illustrates an alternative communication network.

FIG. 3 illustrates a communication network 300. AP 104a provides WLAN access network 1 102a, which overlaps with WLAN access network 2 102b with AP 104b. In this Figure, the wireless terminal 114 is physically located within the range of both WLAN access networks 102a, 102b. The wireless terminal 114 may communicate with both WLAN access networks 102a, 102b, and may receive network discovery information 120 from both networks without associating with either network. In other words, the wireless terminal 114 may receive the network discovery information 120 while in a pre-associated state. As described below with respect to element 404 of FIG. 4, the network discovery information 120 may include a neighbor report which includes information about multiple networks, so the wireless terminal 114 in FIG. 3 may receive information about both access networks 102a, 102b from just one of those networks.

Figure 4:
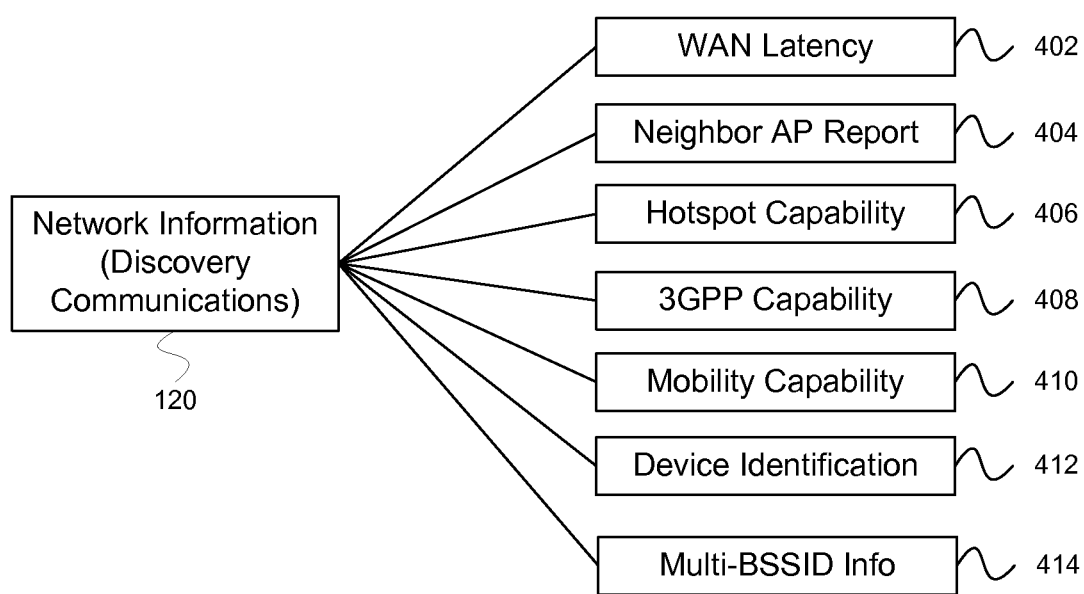
FIG. 4 illustrates network information.

FIG. 4 illustrates network information 120. The network information 120 may include or be referred to as discovery communications 120 because the network information 120 that is communicated may be before associating with the network (i.e. while discovering the network). Access Network Query Protocol ("ANQP") allows a wireless device or WLAN terminal (e.g. a station ("STA")) to request additional network information prior to establishing network connectivity. ANQP may use the Generic Advertisement Service protocol as a transport mechanism for such queries. Network information 120 obtained through ANQP may include: roaming relationships, network services, supported security methods (e.g., IEEE 802.1X and web-based authentication), emergency services capability, available Subscription Service Providers, etc. FIG. 4 illustrates additional or optional network information 120 that supplement the existing IEEE® 802.11 or WFA Hotspot 2.0 wireless communication standards.

WAN Latency

Wide Area Network ("WAN") Latency 402 is one example of network information 120 provided in network communications prior to associating with a network. A wireless terminal (e.g. wireless terminal 114) may not be able to determine latency within a network (e.g. a WAN) without associating with that network. The WAN latency 402 provides a mechanism for the wireless terminal to identify a static or dynamic current and/or average latency periods of particular networks before selecting whether to associate with that network. For mobile device wireless terminals, the customers may expect a high level of service on a particular network (e.g. cellular network) and may not want to associate with a WAN with a high latency. WLAN access locations (or WLAN hotspots) operating under the IEEE® 802.11 standard or under the WFA Hotspot 2.0 wireless communication standard may not receive WAN latency details about WLAN-supported networks (e.g. external networks) prior to network association.

WAN latency 402 or access delay may include the current network's round-trip delay time. The access point may measure the round trip times to obtain a measure of the access delay which may be independent of the device-specific connection conditions (e.g. radio connections). The WAN latency 402 may be a near term metric that provides information on the current loading of the hotspot from the access point, as well as network conditions behind the hotspot such as from the WLAN terminal point of view. The WAN latency 402 may be communicated within the IEEE 802.11 and/or WFA Hotspot 2.0 standards. In one embodiment, WAN latency 402 may be implemented in at least three ways: 1) WAN latency 402 may be a new IEEE 802.11 ANQP element; 2) WAN latency 402 may be a new WFA Hotspot 2.0 element; or 3) WAN latency 402 may be included by modifying the existing WFA Hotspot 2.0 WAN Metrics element. These three implementations will be described below.

In a first example, WAN latency 402 may be a new IEEE 802.11 ANQP element. The WAN latency 402 may include round trip timing values from the access point into the network, corresponding to a current and mean value of the access delay in one embodiment. Table 1 illustrates how the WAN latency 402 may be organized and communicated. Alternative data, lengths, or fields may be used.

TABLE 1

IEEE 802.11 ANQP WAN Latency information format.

|  | Info ID | Length | WAN Current Latency | WAN Mean Latency (optional) |
|---|---|---|---|---|
| Octets: | 2 | 2 | 2 | 2 |

The information identification ("Info ID") field may be an identifier used within the IEEE 802.11 ANQP information identifier definitions. A table showing the network information 120 and corresponding information ID's is shown in FIG. 7. The Length field may be a 2-octet field that is equal to either 2 or 4 depending upon whether the WAN Mean Latency field is present or not. The WAN Current Latency field may be a 2-octet field with a current round trip time value indicating the network access delay measured in milliseconds in one example. The round trip time may be measured using a suitable protocol, for example, either a ping message or using the acknowledgement flag ("ACK") in a Transmission Control Protocol (TCP) message or using a hypertext protocol ("HTTP") post/get message. The WAN Mean Latency field may be a 2-octet field with the mean round trip time value, averaged over a recent time period (e.g. the last minute), indicating the network access delay measured in milliseconds in one example.

In a second example, WAN latency 402 may be a new WFA Hotspot 2.0 element. As described herein WFA Hotspot, WFA Hotspot 2.0 or Hotspot may refer to the Wi-Fi Alliance Hotspot or Wi-Fi Alliance Hotspot 2.0 specifications. The new element in the WFA Hotspot for WAN latency 402 may include round trip timing values from the access point into the network, corresponding to the current and mean value of the access delay. In one embodiment, the format of the WAN latency element is illustrated in Table 2:

TABLE 2

WFA Hotspot WAN Latency element format.

|  | WAN Current Latency | WAN Mean Latency (optional) |
|---|---|---|
| Octets: | 2 | 2 |

The WAN Current Latency field may be a 2-octet field with a current round trip time value indicating the network access delay measured in milliseconds in one example. The round trip time may be measured using a suitable protocol, for example, either a ping message or using the acknowledgement flag ("ACK") in a Transmission Control Protocol (TCP) message or using a hypertext protocol ("HTTP") post/get message. The WAN Mean Latency field may be a 2-octet field with the mean round trip time value, averaged over a recent time period (e.g. the last minute), indicating the network access delay measured in milliseconds in one example.

In a third example, WAN latency 402 may be included by modifying the existing WFA Hotspot WAN Metrics element. The WFA Hotspot specification defines a WAN Metrics element which may be modified to include the WAN latency 402 information discussed above. The existing Hotspot ("HS")WAN Metrics element may be modified to include a WAN Current Latency element and to include a WAN Mean Latency element as shown in Table 3.

TABLE 3

Modified WFA Hotspot WAN Metrics Element.

| | WAN Info | Downlink Speed | Uplink Speed | Downlink Load | Uplink Load | LMD | WAN Current Latency | WAN Mean Latency(optional) |
|---|---|---|---|---|---|---|---|---|
| Octets: | 1 | 4 | 4 | 1 | 1 | 2 | 2 | 2 |

The ANQP protocol may also operate in reverse communication, such that the access point may receive the network information 120 (e.g. the WAN latency 402) from the wireless terminal. For example, when a wireless terminal is already connected to an external network (e.g., a wireless service provider's network via a cellular data link, a personal area network via BLUETOOTH® link, etc.), an access point may be configured to discover the network information 120 (e.g. the WAN latency 402) associated with that external network by querying the wireless terminal. One example would use the techniques described. The communications described may also be used in connection with mesh networking environments, peer to peer, or Wi-Fi Direct networks, to enable a first wireless terminal to discover network information 120 (e.g. the WAN latency 402) by querying a second wireless terminal. Accordingly, the first wireless terminal may connect to an external network associated with the second wireless terminal if the associated network information 120 is deemed acceptable.

Neighbor AP Report

Neighbor Access Point ("AP") Report 404 is another example of network information 120 provided in network discovery communications. The Neighbor AP Report 404 may inform a wireless terminal about neighboring access points. In particular the Neighbor AP Report 404 may be used to inform a wireless terminal about neighboring access points that are members of either a basic service set ("BSS") or an extended service set ("ESS") requested in a Neighbor Report request, where the existing IEEE 802.11 establishes a Neighbor Report element. In particular, the IEEE 802.11 § 8.4.2.39 (Draft P802.11-REVmb/D9.2 July 2011) defines the Neighbor Report element and is herein incorporated by reference. The details or information from the Neighbor Report element may be communicated as the Neighbor AP Report 404 during network discovery before associating with a network. The Neighbor AP Report 404 may be transmitted by access points to provide a wireless terminal with information about not only that access point, but also neighboring access points without requiring the wireless terminal to associate with an access point. The Neighbor AP Report 404 may also be used for stations ("STA") that are not access points, for example, mesh, peer to peer, ad hoc or Wi-Fi Direct devices. This Neighbor AP Report 404 may be used by a wireless terminal in identifying which access point or network to associate with.

A neighbor report request/response is sent to an access point which returns a neighbor report containing information about known neighboring access points that may be available for wireless terminals. The access point may receive information about neighboring access points from measurements received from within either a basic service set ("BSS") or an extended service set ("ESS"). In particular, a neighbor report may include information on access points which may be used as candidates for a BSS transition. The Neighbor AP Report 404 may be provided prior to associating with a particular access point. During network discovery a device may receive a neighbor report about neighboring access points without associating with a particular access point.

The Neighbor AP Report 404 may include a timestamp field to provide an indication of when the neighbor report was compiled. Some information about the area over which the neighbors are located may be included in the Neighbor AP Report 404. The geographic information may indicate whether the neighbor is a local hotspot or a local area network (e.g. 100 meter radius) or wider. This value may be included in the Neighbor AP Report 404 as a radius or coverage field.

In one embodiment, the Neighbor AP Report 404 may be implemented in at least three ways: 1) Neighbor AP Report 404 may be a first new IEEE 802.11 ANQP element; 2) Neighbor AP Report 404 may be a second new IEEE 802.11 ANQP element; or 3) Neighbor AP Report 404 may be a new WFA Hotspot element. These three exemplary implementations will be described below. Additional embodiments may include different implementations.

In a first example, the Neighbor AP Report 404 may be a first new IEEE 802.11 ANQP element. In one embodiment, the Neighbor AP Report 404 may be embodied as with the Neighbor Report element IEEE 802.11 as defined in 8.4.2.39, the entire disclosure of which is hereby incorporated by reference. However, the Neighbor AP Report 404 is provided during network discovery prior to network association, or in a pre-associated state. The format of the Neighbor AP Report 404 may include an information identification ("Info ID") field that may correspond with the Neighbor AP Report 404 element. The Info ID field may be an identification of a particular element within the IEEE 802.11 specification. In one embodiment, FIG. 7 illustrates values for the Info ID, including the Info ID for the Neighbor AP Report 404. Alternatively, the length of the neighbor report element may be variable. The length of the neighbor report element may also be set as its own element or variable. The variation in length may depend on a number of neighboring access points that are included in the report. The neighbor report element may include an "element ID" and a "length" field. With an expansion of the format, "Info ID, "Length", "Element ID", and "Length" may result in two octets of redundant data. Accordingly, in this example, format may be reduced for efficiency such that an exemplary format of the Neighbor AP Report 404 is:

TABLE 4

IEEE 802.11 ANQP Neighbor AP Report Format 1

| | Info ID | Length | <Neighbor Report Element> |
|---|---|---|---|
| Octets: | 2 | 2 | variable |

In a second example, the Neighbor AP Report 404 may be a first new IEEE 802.11 ANQP element. In this example, the sub-fields from the Neighbor Report element as shown and described in the IEEE 802.11 Specification in § 8.4.2.39 (Draft P802.11-REVmb/D9.2 July 2011) may be utilized to avoid the duplication of header fields. As defined in the IEEE 802.11 Specification, the Neighbor Report Element includes an information identifier, length, basic service set identifier ("BSSID"), BSSID Information, operating class, channel number, physical layer, and optional subelements.

TABLE 5

IEEE 802.11 ANQP Neighbor AP Report Format 2

| | Info ID | Length | BSSID | BSSID information | Operating Class | Channel Number | PHY Type | Optional Subelements |
|---|---|---|---|---|---|---|---|---|
| Octets: | 2 | 2 | 6 | 4 | 1 | 1 | 1 | variable |

The BSSID is the identifier of the particular basic service set ("BSS") that is being reported. The other elements from Table 5 relate to this particular BSS. The BSSID Information field may be used to determine neighbor service set transition candidates.

In one embodiment, the BSSID Information field includes access point reachability, security, key scope, capabilities, mobility domain, and high throughput as its subfields defined in the IEEE 802.11 Specification. The reachability field indicates whether the access point identified by the BSSID is reachable by the wireless device or terminal that requested the neighbor report. Security may be a bit that indicates whether the access point identified by the BSSID supports the same security provisioning as used by the wireless device in its current association. In alternative embodiments, since the Neighbor AP Report 404 is transmitted prior to connecting with a network, the security may be a more detailed identification of the type of security used by the access point identified by the BSSID. The key scope may indicate the authentication, and the capabilities may refer to selected capabilities available with the access point.

Referring to Table 5, the operating class may indicate a channel set of the access point indicated by the BSSID. The operating class combined with the channel number specify the channel frequency and spacing for the access point indicated by the BSSID. The physical layer ("PHY") type field indicates the physical layer type of the access point indicated by the BSSID. Optional subelements are described and illustrated in Table 8-114 of the IEEE 802.11 Specification in § 8.4.2.39 (Draft P802.11-REVmb/D9.2 July 2011).

In a third example, the Neighbor AP Report 404 may be a new WFA Hotspot element. A new element may be included in the WFA Hotspot wireless communications standards. WFA Hotspot or Hotspot may refer to the Wi-Fi Alliance Hotspot or Wi-Fi Alliance Hotspot 2.0 specifications. The new element in the WFA Hotspot for a Neighbor AP Report 404 may include a neighbor report element as discussed above in the other two examples. The format of the Neighbor AP Report 404 may be illustrated as in Table 6:

TABLE 6

WFA Hotspot Neighbor AP Report Format

| | Neighbor Report Element |
|---|---|
| Octets | variable |

Hotspot Capability

Hotspot capability 406 is another example of network information 120 provided in network discovery communications. The hotspot capability 406 information may be used to inform a wireless device about certain aspects from the WFA Hotspot 2.0 capabilities that are supported by a particular access point or hotspot. The WFA Hotspot or Hotspot may refer to the Wi-Fi Alliance Hotspot or Wi-Fi Alliance Hotspot 2.0 specifications. The Hotspot 2.0 specification includes a set of features that may or may not be available for certain hotspots. Features from Hotspot 2.0 specification that are available in a particular hotspot are included in the hotspot capability 406 information that is returned by that hotspot during discovery and before a device associates with the hotspot. Compliance with the Hotspot 2.0 specification and inclusion of certain features may be used in determining whether a wireless device should associate with a particular network. Accordingly, the hotspot capability 406 may be communicated during network discovery (e.g. with ANQP) before associating with a network. The hotspot capability 406 may be considered to an advertisement for a particular hotspot to advertise which features it supports, which may make it a more desirable network to associate with than other networks that do not support the same features.

In particular, the elements included with the hotspot capability 406 are listed below in Table 9 and may include:
  Secure Initial Authentication (also known as Online Sign-Up ("OSU")) capability may include a system in which a mobile device that does not have a prior relationship with a service provider is able to securely establish one. The user may select a service provider to register with, either by choosing a friendly name or icon. It is part of the WFA Hotspot 2.0 specification.
  Subscription provisioning may include the credential mechanisms that are required for associating with a network together with related metadata. It may include user entered information or the presence of a SIM card. Provisioning may include the configuration of a device and include enabling and disabling features.

Policy provisioning may refer to the policies that a device or network utilizes.

Open Mobile Alliance ("OMA")/Simple Object Access Protocol ("SOAP")-Extensible Markup Language ("XML") are protocols for exchanging information in networks.

Managed object may refer to the network resources that are managed. For example, operation, administration, maintenance, and provisioning application protocols may be used to manage resources in a telecommunications environment.

Open Mobile Alliance ("OMA") device management is a protocol for the management of mobile devices that include support for provisioning, configuration, upgrades, and fault management.

In one embodiment, the hotspot capability 406 may be implemented in at least two ways: 1) hotspot capability 406 may be a new IEEE 802.11 ANQP element; and 2) hotspot capability 406 may be a new WFA Hotspot element. These two exemplary implementations will be described below. Additional embodiments may include different implementations.

In a first example, the hotspot capability 406 may be a new IEEE 802.11 ANQP element. The new element may include capabilities that were part of the WFA Hotspot 2.0 specification. The hotspot capability 406 may include a list of potential capabilities, such as online sign-up, subscription provisioning, policy provisioning, or XML protocols as discussed above. The information identification ("Info ID") field may be an identifier used within the IEEE 802.11 ANQP specification. A table showing the exemplary network information 120, including the hotspot capability 406, and corresponding information ID's is shown in FIG. 7. The length may correspond to the length of the optional hotspot capability sub-fields. In one embodiment, the length may reflect the number of hotspot capability sub-fields that are present.

Table 7 illustrates one embodiment for the hotspot capability 406 element:

TABLE 7

IEEE 802.11 ANQP Hotspot Capability Format

|  | Info ID | Length | Hotspot Capabilty #1 (optional) | ... | Hotspot Capabilty #n (optional) |
|---|---|---|---|---|---|
| Octets: | 2 | 2 | 17 |  | 17 |

In one implementation the format for each of the hotspot capability sub-fields includes a capability identifier and a capability version. In other words, each of the hotspot capability fields from Table 7 includes an identifier (ID) and the capability version. In one example, the format for the hotspot capability sub-fields is illustrated in Table 8:

TABLE 8

IEEE 802.11 ANQP Hotspot Capability Sub-Field Format

|  | Hotspot Capability ID | Hotspot Capability Version |
|---|---|---|
| Octets: | 1 | 16 |

The hotspot capability ID may include the following exemplary identifiers as in Table 9:

TABLE 9

Hotspot Capability Identifiers (ID's)

| Entity Name | Value |
|---|---|
| Reserved | 0 |
| Open Mobile Alliance Device Management (OMA DM) | 1 |
| Simple Object Access Protocol - Extensible Markup Language (SOAP-XML) | 2 |
| Secure Initial Authentication/Online Sign-up (OSU) | 3 |
| Subscription Provisioning | 4 |
| Policy Provisioning | 5 |
| Managed Object (MO) | 6 |
| User Acceptance of Terms & Conditions | 7 |
| Certificate Enrollment Protocol | 8 |

In alternative embodiments, there may be additional, fewer, or different hotspot capabilities that are included as part of the hotspot capability 406.

The Hotspot Capability Version may a 16-octet field that contains the value of the version number of the Hotspot Capability, for example, "1.0.5". This provides an indication of which version is supported in the network. In alternative embodiments the Hotspot Capability Version field may not be present.

In a second example, the hotspot capability 406 may be a new WFA Hotspot element. A new element may be included in the WFA Hotspot wireless communications standards. As described herein WFA Hotspot may refer to the Wi-Fi Alliance Hotspot or Wi-Fi Alliance Hotspot 2.0 specifications. The new element in the WFA Hotspot for a hotspot capability 406 may include Hotspot Capabilities as discussed above. In one embodiment, the format of the Hotspot Capability 406 is illustrated in Table 10:

TABLE 10

WFA Hotspot Capability Format

|  | Hotspot Capability #1 (optional) | ... | Hotspot Capability #n (optional) |
|---|---|---|---|
| Octets: | 17 |  | 17 |

The Hotspot Capability sub-fields may be similar to those illustrated in Table 8.

3GPP Capability

Third Generation Partnership Project ("3GPP") capability 408 is another example of network information 120 provided in network discovery communications. 3GPP is a group of telecommunications companies that created and maintain standards, such as the third-generation mobile phone system specification. 3GPP may include additional standards and specifications that are maintained, such as Global System for Mobile Communications ("GSM"), and IP Multimedia Subsystem ("IMS").

Certain elements related to 3GPP capabilities may be beneficial to a wireless device prior to associating with a particular network. In particular, the 3GPP capability 408 that is communicated prior to network connection may include information about what 3GPP capabilities a network has. The 3GPP capability 408 may be used by a wireless device to determine which capabilities that a particular network supports, which may be useful in selecting which network associate with. The 3GPP capability 408 is included as part of the network information 120 that is available from access points to a wireless device without associating with the network. Some networks may not be connected with a 3GPP network, in which case the access point may respond to a request for 3GPP capabilities with an error or null value.

Exemplary 3GPP capabilities include 1) Access Network Discovery and Selection Function ("ANDSF") support; 2) IP Multimedia Subsystem ("IMS") support; and/or 3) Generic Access Network ("GAN") support. In other words, the 3GPP capability 408 may include an indication as to whether a network has support for ANDSF, IMS, or GAN in one embodiment. ANDSF support may relate generally to whether a device can discover non-3GPP access networks that may be used for data communications. In one example, ANDSF support may allow a wireless device or terminal to discover a cost for connecting to a WLAN network supported by a mobile provider or cellular network (e.g. T-Mobile or AT&T hotspots). ANDSF support may provide information about a cellular network through the WLAN network. Some IMS support may relate generally to whether multimedia can be communicated using IMS. In one example, IMS allows streaming multimedia through a mobile or cellular network. The IMS support may allow a user to switch between a cellular/mobile network with a WLAN and maintain the streaming multimedia. GAN support may relate generally to whether mobile voice, data, and IMS applications can be extended between networks.

In one embodiment, the 3GPP capability 408 may be implemented in at least two ways: 1) 3GPP capability 408 may be a new IEEE 802.11 ANQP element; or 2) 3GPP capability 408 may be a new WFA Hotspot element. These two exemplary implementations will be described below. Additional embodiments may include different implementations.

In a first example, the 3GPP capability 408 may be a new IEEE 802.11 ANQP element. The 3GPP capability 408 may include an info ID (e.g. FIG. 7) and a length field. The length field may correspond to a length of the 3GPP entities that are included. The 3GPP entity fields may correspond to each capability that are included (e.g. support for ANDSF, IMS, and/or GAN). The 3GPP capability 408 may also include a version that refers to the particular 3GPP release that the capability conforms to. In one embodiment, the 3GPP capability 408 may be formatted as in Table 10:

TABLE 10

IEEE 802.11 ANQP 3GPP Capability Format

|  | Info ID | Length | 3GPP Release | 3GPP Entity #1 (optional) | ... | 3GPP Entity #n (optional) |
|---|---|---|---|---|---|---|
| Octets: | 2 | 2 | 1 | 17 | | 17 |

Each of the 3GPP entity fields may include an entity identifier sub-field as well as a 3GPP entity version field as in Table 11:

TABLE 11

EEE 802.11 ANQP 3GPP Entity Sub-Field Format

|  | 3GPP Entity ID | 3GPP Entity Version |
|---|---|---|
| Octets: | 1 | 16 |

The 3GPP entity ID may include a value for each 3GPP entity that is present in the 3GPP network. In one embodiment, the 3GPP entity ID's may be assigned as in Table 12:

TABLE 12

IEEE 802.11 ANQP 3GPP Entity ID's

| Entity Name | Value |
|---|---|
| Reserved | 0 |
| Access Network Discovery and Selection Function (ANDSF) | 1 |
| IP Multimedia Subsystem (IMS) | 2 |
| Genetic Aecess Network (GAN) | 3 |

The 3GPP Entity Version is a 16-octet field that contains the value of the version number of the 3GPP Entity, for example, "Rel 5.6.9". This provides an indication of which version is supported in the network. In alternative embodiments the 3GPP Entity Version field may not be present.

In a second example, the 3GPP capability 408 may be a new WFA Hotspot element. A new element may be included in the WFA Hotspot wireless communications standards. As described herein WFA Hotspot may refer to the Wi-Fi Alliance Hotspot or Wi-Fi Alliance Hotspot 2.0 specifications. The new element in the WFA Hotspot for a 3GPP capability 408 may include 3GPP capabilities as discussed above. In one embodiment, the format of the 3GPP capability 408 is illustrated in Table 13:

TABLE 13

WFA Hotspot 3GPP Capability Format

|  | 3GPP Release | 3GPP Entity #1 (optional) | ... | 3GPP Entity #n (optional) |
|---|---|---|---|---|
| Octets: | 1 | 17 | | 17 |

The 3GPP Entity sub-fields may be similar to those illustrated in Table 11.

Mobility Capability

Mobility capability 410 is another example of network information 120 provided in network discovery communications. The mobility capability 410 may include mobility protocols or entities that may be communicated about a network before associating with that network. The Mobility capability 410 information may be used to inform a wireless device about certain mobility protocols that a network may or may not use. Whether a network communicates with certain mobility protocols may be used during network discovery when a wireless device is selecting a network to associate with. Accordingly, mobility capability 410 may be communicated during network discovery (e.g. with ANQP) before associating with a network.

Examples of the mobility capability 410 include Columbia, mobile internet protocol ("IP"), cellular IP, hierarchical mobile IP ("HMIP"), fast mobile IP ("FMIP"), general packet radio service ("GPRS") tunneling protocol ("GTP"), and proxy mobile IP version 6 ("PMIPv6"). Columbia may refer to a micro-mobility suite and whether communications may occur with that software. Mobile IP may be a protocol for transferring a connection between networks using an anchored/tethered internet protocol ("IP") address. For example, voice calls may be passed between networks using the mobile IP protocol. Cellular IP may be used to allow seamless IP mobility between different packet data serving node domains. Hierarchical mobile IP ("HMIP") is an enhancement of Mobile Internet Protocol ("Mobile IP") that may reduce the amount of signaling required and to improve handoff speed for mobile connections. Fast mobile IP ("FMIP") is a mobility protocol that is designed to improve a handover between nodes. GTP is a group of IP-based communications protocols used to carry General Packet Radio Service ("GPRS") within mobile or cellular networks. Proxy Mobile IPv6 ("PMIPv6") is a network-based mobility management protocol standardized designed to be independent of mobile networks, while accommodating various access technologies. The above are merely examples of mobility capabilities 410 that may be transmitted using ANQP during network discovery. Additional mobility capabilities and protocols may be included with the mobility capabilities 140.

In one embodiment, the mobility capability 410 may be implemented in at least two ways: 1) mobility capability 410 may be a new IEEE 802.11 ANQP element; or 2) mobility capability 410 may be a new WFA Hotspot element. These two exemplary implementations will be described below. Additional embodiments may include different implementations.

In a first example, the mobility capability 410 may be a new IEEE 802.11 ANQP element. The mobility capability 410 may include an info ID (e.g. FIG. 7) and a length field. The length field may correspond to a length or number of the mobility protocols that are included. The mobility protocols may correspond to each capability that is included. In one embodiment, the mobility capability 410 may be formatted as in Table 14:

TABLE 14

IEEE 802.11 ANQP Mobility Capability Format

|  | Info ID | Length | Mobility Protocol #1 (optional) | ... | Mobility Protocol #n (optional) |
| --- | --- | --- | --- | --- | --- |
| Octets: | 2 | 2 | 17 |  | 17 |

Each of the mobility protocol fields may include a protocol identifier sub-field as well as a mobility protocol version field as in Table 15:

TABLE 15

IEEE802.11 ANQP Mobility Sub-Field Format

|  | Mobility Protocol ID | Mobility Protocol Version |
| --- | --- | --- |
| Octets: | 1 | 16 |

The mobility protocol ID may include a value for each mobility protocol that is supported by the network. In one embodiment, the mobility protocol ID's may be assigned as shown in Table 16:

TABLE 16

IEEE 802.11 ANQP Mobility Protocol ID's

| Entity Name | Value |
| --- | --- |
| Reserved | 0 |
| Columbia | 1 |
| Mobile IP | 2 |
| Cellular IP | 3 |
| HMIP | 4 |

TABLE 16-continued

IEEE 802.11 ANQP Mobility Protocol ID's

| Entity Name | Value |
| --- | --- |
| Fast Mobile IP (FMIP) | 5 |
| GPRS Tunneling Protocol (GTP) | 6 |
| Proxy Mobile IP version 6 (PMIPv6) | 7 |

The Mobility Protocol Version is a 16-octet field that may include the value of the version number of the Mobility Protocol, for example, "v1.2". This may provide an indication of which version is supported in the network. In alternative embodiments the Mobility Protocol Version field may not be present.

In a second example, the mobility capability 410 may be a new WFA Hotspot element. A new element may be included in the WFA Hotspot wireless communications standards. As described herein WFA Hotspot may refer to the Wi-Fi Alliance Hotspot or Wi-Fi Alliance Hotspot 2.0 specifications. The new element in the WFA Hotspot for a mobility capability 410 may include mobility protocols as discussed above. In one embodiment, the format of the mobility capability 410 is illustrated in Table 17:

TABLE 17

WFA Hotspot Mobility Protocol Format

|  | Mobility Protocol #1 (optional) | ... | Mobility Protocol #n (optional) |
| --- | --- | --- | --- |
| Octets: | 17 |  | 17 |

The Mobility Protocol sub-fields may be similar to those illustrated in Table 15.

Device Identification

Device identification 412 is another example of network information 120 provided in network discovery communications. A type of station ("STA") may be identified with the device identification 412. STA may refer to either side of a network, including wireless devices, terminals, and access points. In particular, a WLAN terminal may be informed about a type of STA or wireless device that it receives an ANQP response from. The WLAN terminal may utilize different capability differences between the STAs that are attempting to communicate with it. The device identification 412 may include a type of device, and the communication of device type may determine the communication with that device. The device identification 412 may include identification information about a network provider (e.g. access point 104a) as well as an end user device (e.g. wireless device 114). In other words, the device identification 412 may identify types of devices on both ends of network communication.

In one embodiment, the device identification 412 may be implemented in at least two ways: 1) device identification 412 may be a new IEEE 802.11 ANQP element; or 2) device identification 412 may be a new WFA Hotspot element. These two exemplary implementations will be described below. Additional embodiments may include different implementations.

In a first example, the device identification 412 may be a new IEEE 802.11 ANQP element. The device identification 412 may include an info ID (e.g. FIG. 7) and a length field. The length field may correspond to a length or number of the STA identifications that are included. The STA identifications may correspond to each type of device that is identified. In one embodiment, the device identification 412 may be formatted as in Table 18:

TABLE 18

IEEE 802.11 ANQP Device Identification Format

|  | Info ID | Length | STA identification |
|---|---|---|---|
| Octets: | 2 | 2 | 2 |

The STA identification sub-field may be formatted as shown in Table 19:

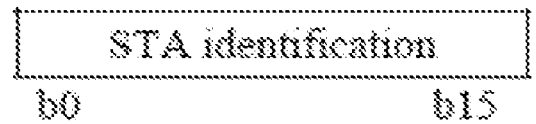
Table 19: IEEE 802.11 ANQP Device Identification Sub-Field Format

The STA identification sub-field may include a set of bits (e.g. b0-b15 for a 16-bit field) that correspond to available types of STA's. The bits of the STA identification sub-field may each correspond to a particular device or STA as shown in Table 20:

TABLE 20

IEEE 802.11 ANQP Device Identification Sub-Field Bits

| STA identification | Bit |
|---|---|
| Reserved | 0 |
| non-AP STA | 1 |
| AP | 2 |
| QoS AP | 3 |
| QoS STA | 4 |
| HT STA | 5 |
| VHT STA | 6 |
| 60 GHz STA | 7 |
| MESH STA | 8 |
| Dependant STA | 9 |
| Enabling STA | 10 |
| Reserved | 11-15 |

The non-AP STA bit and AP STA bit refer to whether a STA is an access point or not. Since a STA can be either a wireless device/terminal or an access point, the non-AP STA and AP bits identify whether a STA is or is not an access point. The quality of service ("QoS") bits identifies QoS stations or access points. High throughput ("HT") and very high throughput ("VHT") identify stations based on the operating speed. The 60 gigahertz ("GHz") STA identifies stations that operate at the 60 GHz frequency. The Mesh STA identifies stations that can operate in a mesh network environment. A mesh environment may not have specific access points and end terminals, since all STA in the mesh are autonomously connected throughout the network. The Dependant STA identifies a station that is dependant upon an enabling STA for channel and band information as may be found in "White Spaces" operation. The Enabling STA identifies a station that is capable of receiving channel and band information out of band (e.g., it can connect to a channel database through another media).

In a second example, device identification 412 may be a new WFA Hotspot element. A new element may be included in the WFA Hotspot wireless communications standards. As described herein WFA Hotspot may refer to the Wi-Fi Alliance Hotspot or Wi-Fi Alliance Hotspot 2.0 specifications. The new element in the WFA Hotspot for device identification 412 may include station identification types as discussed above. In one embodiment, the format of the device identification 412 is illustrated in Table 21:

TABLE 21

WFA Hotspot Device Identification Format

|  | STA Identification |
|---|---|
| Octets: | 2 |

The STA identification sub-fields may be similar to those illustrated in Table 20.

Multi-BSSID Information

Multi-BSSID information 414 is another example of network discovery information 120 provided in network discovery communications. A basic service set ("BSS") is a set of all stations that can communicate with each other. Each BSS has an identifier ("ID") called the BSSID, which is the MAC address of the access point servicing the BSS. Multi-BSSID allows for communication of information from multiple access points or hotspots in one area, that have some form of intercommunication. In particular, multi-BSSID information 414 may be communicated using a single ANQP message (either defined in IEEE 802.11, WFA Hotspot 2.0 or within this document) before associating with a network and provide details on multiple access points or hotspots.

The multi-BSSID information 414 may be used for identifying a plurality of information about many access networks associated with a particular WLAN, not just the one it is connected to. Typical WLAN access points may be physically implemented as multiple logical access points. The multi-BSSID information request allows another single ANQP request (either defined in IEEE 802.11, WFA Hotspot 2.0 or within this document) to be sent to an access point. If that access point is one of multiple access points or hotspots in one area, that have some form of intercommunication between them, this message may allow all the information from those multiple access points to be returned within the Multi-BSSID response. In other words, information about multiple logical access points can be received using a single multi-BSSID message.

The multi-BSSID information 414 may relay a specific ANQP request from one wireless terminal (or station ("STA")), through a single access point, to determine information from neighboring STAs or terminals. For example, a list of the venue names of neighboring STAs may be returned. The multi-BSSID request may comprise the Info ID for "Multi-BSSID" (e.g., 278) followed by the Info ID for "Venue Name" (e.g. 258). The Venue Name ANQP message may be as defined in IEEE 802.11. This ANQP request may be sent to a single access point, and instead of directly responding with the venue name of itself, the access point forwards the request to all its neighboring STAs that it has a connection with. For each response from its neighbors, the access point may provide a "Multi-BSSID Information sub-field" within the final response (as described in Table 23). This mechanism may also apply to virtual logical access points housed in one physical access point unit. Security concerns may limit certain information from passing from one logical STA domain to another. If the information cannot be determined then suitable error codes may be passed back to the originating STA.

In one embodiment, the multi-BSSID information 414 may be implemented in at least two ways: 1) multi-BSSID information 414 may be a new IEEE 802.11 ANQP element; or 2) multi-BSSID information 414 may be a new WFA Hotspot element. These two exemplary implementations will be described below. Additional embodiments may include different implementations.

In a first example, the multi-BSSID information 414 may be a new IEEE 802.11 ANQP element. The ANQP multi-BSSID information 414 may include information about the neighboring STAs based on a specific ANQP element ("AE"). In one embodiment, the format of the multi-BSSID information 414 is shown in Table 22:

TABLE 22

IEEE 802.11 ANQP Multi-BSSID Information Format

|  | Info ID | Length | ANQP BSSID Information #1 | ... | ANQP BSSID Information #n |
|---|---|---|---|---|---|
| Octets: | 2 | 2 | variable | ... | variable |

The information identification ("Info ID") field may be an identifier used within the IEEE 802.11 ANQP information identifier definitions. A table showing the exemplary network information 120 and corresponding information ID's is shown in FIG. 7. The Length field may be a 2-octet field that is equal to the length of the optional ANQP BSSID information sub-fields. One embodiment of the ANQP BSSID information sub-fields is shown in Table 23:

TABLE 23

IEEE 802.11 ANQP Multi-BSSID Information Sub-Field Format

| | SSID element | BSSID element | <AE> |
|---|---|---|---|
| Octets: | variable | variable | variable |

The service set identifier ("SSID") element is an identifier of a particular WLAN. The SSID element may include a field length indication that establishes the length of the SSID. In one example, the SSID may be up to 32 characters. The basic service set identifier ("BSSID") element may identify a basic service set ("BSS"). In one example, the SSID may be used in multiple or even overlapping BSSs. The BSSID may be the Media Access Control ("MAC") address of the access point. The ANQP element ("AE") field may be a variable length field, containing any other AE. In alternative embodiments, elements from other advertisement protocols may be used.

In a second example, multi-BSSID information 414 may be a new WFA Hotspot element. A new element may be included in the WFA Hotspot wireless communications standards. As described herein WFA Hotspot may refer to the Wi-Fi Alliance Hotspot or Wi-Fi Alliance Hotspot 2.0 specifications. The new element in the WFA Hotspot for multi-BSSID information 414 may include SSID, BSSID, and ANQP elements as discussed above. In one embodiment, the format of the multi-BSSID information 414 is illustrated in Table 24:

TABLE 24

WFA Hotspot Multi-BSSID Information Format

| | HS BSSID Information #1 | . . . | HS BSSID Information #n |
|---|---|---|---|
| Octets: | variable | . . . | variable |

In one embodiment, the format of the Hotspot BSSID Information sub-field is shown in Table 25:

TABLE 25

WFA Hotspot Multi-BSSID Information Sub-Field Format

| | SSID Element | BSSID element | <HE> |
|---|---|---|---|
| Octets: | variable | variable | variable |

The Hotspot 2.0 element ("HE") field is a variable length field that may contain any other Hotspot 2.0 element as defined in WFA Hotspot 2.0 or other Hotspot specifications. Elements from other advertisement protocols may also be used.

Figure 5:
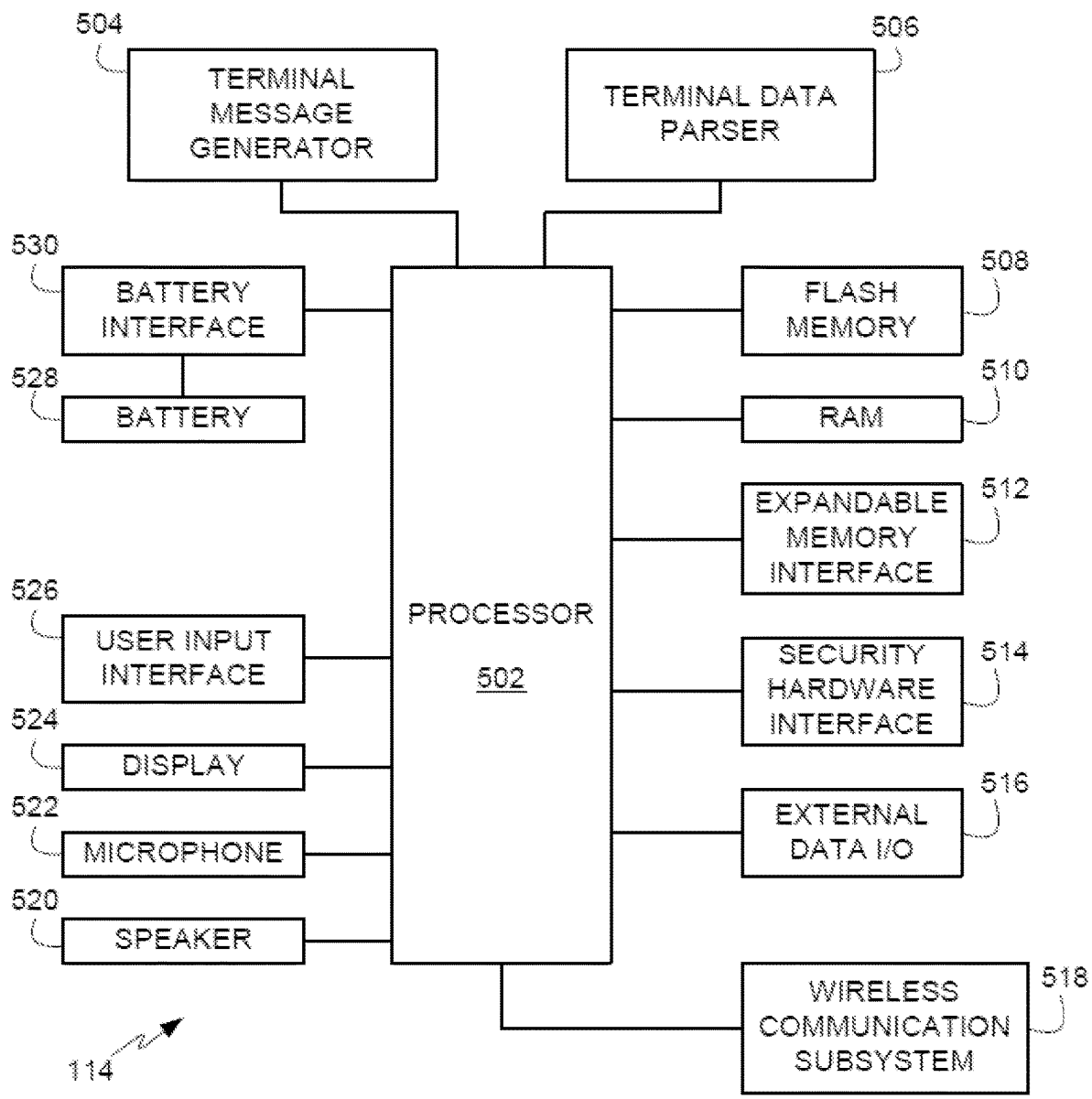
FIG. 5 illustrates a wireless terminal.

FIG. 5 illustrates a wireless terminal 114 as shown in FIGS. 1 and 3. The wireless terminal 114 includes a processor 502 that may be used to control the overall operation of the wireless terminal 114. The processor 502 may be implemented using a controller, a general purpose processor, a digital signal processor, dedicated hardware, or any combination thereof. The processor 502 may include a central processing unit, a graphics processing unit, a digital signal processor or other type of processing device. The processor 502 may be a component in any one of a variety of systems. For example, the processor 502 may be part of a standard personal computer or a workstation. The processor 502 may be one or more general processors, digital signal processors, application specific integrated circuits, field programmable gate arrays, servers, networks, digital circuits, analog circuits, combinations thereof, or other now known or later developed devices for analyzing and processing data. The processor 502 may operate in conjunction with a software program, such as code generated manually (i.e., programmed).

The wireless terminal 114 also includes a terminal message generator 504 and a terminal data parser 506. The terminal message generator 504 may generate network information discovery messages such as the discovery request 116 and discover response 118 for communicating the network information 120 from FIG. 1. The terminal data parser 506 may be used to retrieve network information from memory (e.g., random access memory 510, etc.). For example, the terminal data parser 506 may retrieve network information 120 that is cached in the wireless terminal 114 after receipt from a WLAN (e.g., the access networks 106a-c of FIG. 1).

In the illustrated embodiment, the terminal message generator 504 and the terminal data parser 506 are shown as separate from and connected to the processor 502. In alternative embodiments, the terminal message generator 504 and the terminal data parser 506 may be implemented in the processor 502 and/or in a wireless communication subsystem (e.g., a wireless communication subsystem 518). The terminal message generator 504 and the terminal data parser 506 may be implemented using any combination of hardware, firmware, and/or software. For example, one or more integrated circuits, discrete semiconductor components, and/ or passive electronic components may be used. For example, the terminal message generator 504 and the terminal data parser 506, or parts thereof, may be implemented using one or more circuits, programmable processors, application specific integrated circuits, programmable logic devices, field programmable logic devices, etc.

The terminal message generator 504 and the terminal data parser 506, or parts thereof, may be implemented using instructions, code, and/or other software and/or firmware, etc. stored on a machine accessible medium and executable by, for example, a processor (e.g., the processor 502). The terminal message generator 504 or the terminal data parser 506 may be stored on or include a tangible storage medium or memory. For example, the terminal message generator 504 or the terminal data parser 506 may be implemented in software stored on a memory that is executable by the processor 502. Alternatively, the terminal message generator 504 and/or the terminal data parser 506 may be implemented in hardware with software functions. The memory for storing software associated with the terminal message generator 504 and/or the terminal data parser 506 may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. In one embodiment, the memory may include the random access memory 510 for the processor 502, or may be an external storage device or database for storing recorded ad or user data. Examples include a hard drive, compact disc ("CD"), digital video disc ("DVD"), memory card, memory stick, floppy disc, universal serial bus ("USB") memory device, or any other device operative to store ad or user data. The memory is operable to store instructions executable by the processor 502.

The wireless terminal 114 may include a FLASH memory 508, a random access memory 510, and/or an expandable memory interface 512 coupled with the processor 502. The FLASH memory 508 may store computer readable instructions and/or data. In some embodiments, the FLASH memory 508 and/or the RAM 510 may store the network information 120 from FIG. 1 and instructions for communicating that network information 120. The processor 502 may be coupled with the memory (e.g. the FLASH memory 508, or the RAM 510) for storing software instructions executable by the processor 502. The memory may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. The functions, acts or tasks illustrated in the figures or described herein may be performed by the programmed processor 502 executing the instructions stored in the memory. The functions, acts or tasks are independent of the particular type of instruction set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The wireless terminal 114 may include a security hardware interface 514 to receive a SIM card from a wireless service provider. A SIM card may be used for network discovery communications including authentication of the wireless terminal 114 for establishing a connection with a WLAN-supported network. The wireless terminal 114 may be provided with an external data I/O interface 516. The external data I/O interface 516 may be used by a user to transfer information to the wireless terminal 114 through a wired medium.

The wireless terminal 114 may include wireless communication subsystem 518 to enable wireless communications with access points (e.g., the access points 104*a-c* of FIG. 1). Although not shown, the wireless terminal 114 may also have a long-range communication subsystem to receive messages from, and send messages to, a cellular wireless network. In the illustrated examples described herein, the wireless communication subsystem 518 can be configured in accordance with the IEEE® 802.11 standard. In other example implementations, the wireless communication subsystem 518 may be implemented using a BLUETOOTH® radio, a ZIGBEE® device, a wireless USB device, an ultra-wideband radio, a Near Field Communications ("NFC") device, or a Radio Frequency Identifier ("RFID") device.

The wireless terminal 114 may include a user interface for communicating with the wireless terminal. The user interface may be separate component or it may include a speaker 520, a microphone 522, a display 524, and a user input interface 526. The display 524 may be a liquid crystal display, an organic light emitting diode, a flat panel display, a solid state display, a cathode ray tube, a projector, a printer or other now known or later developed display device for outputting determined information. The user input interface 526 may include alphanumeric keyboard and/or telephone-type keypad, a multi-direction actuator or roller wheel with dynamic button pressing capability, a touch panel, etc. The network discovery information that is communicated with a network prior to connection may be communicated with or without each of the user interfaces described herein. The speaker, 520, the microphone 522, the display 524, the user input interface 526, and/or any combination thereof may be omitted in alternative embodiments. In one embodiment, the wireless terminal 114 is a battery-powered device and includes a battery 528 and a battery interface 530.

Figure 6:
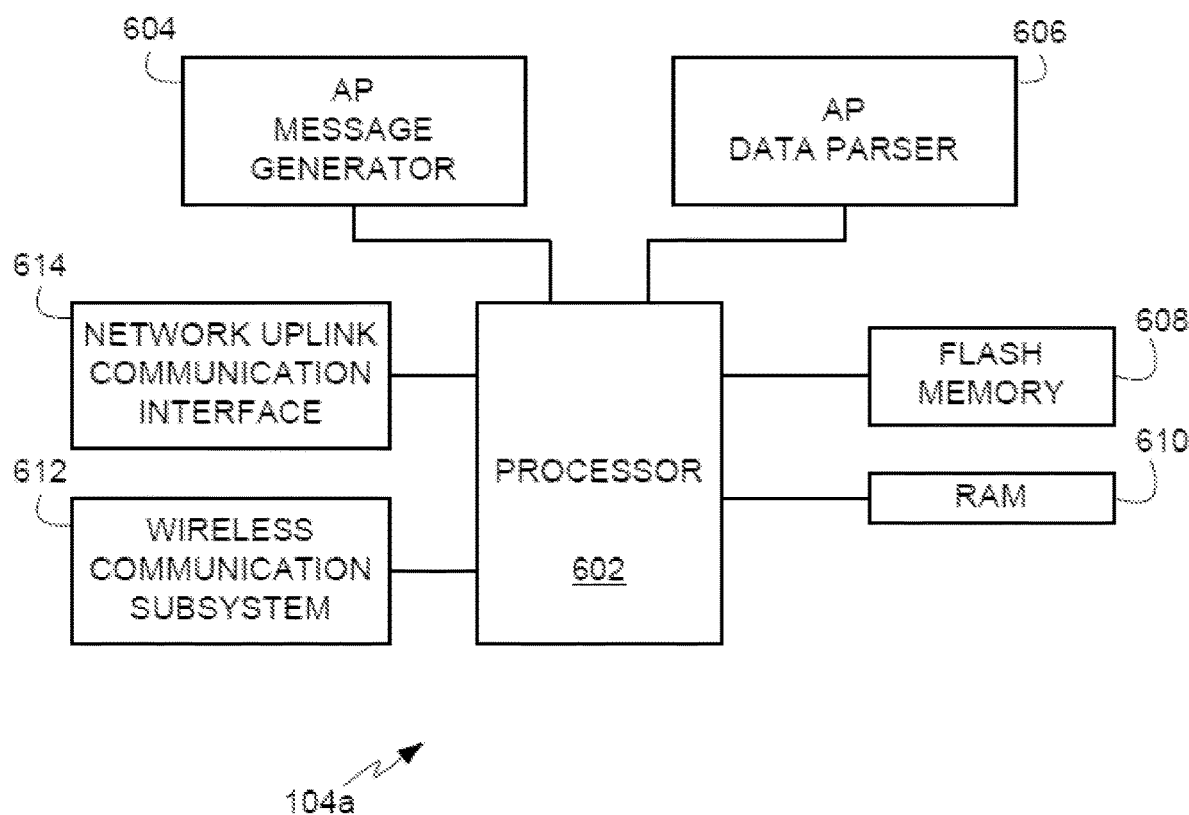
FIG. 6 illustrates an access point.

FIG. 6 illustrates an access point ("AP") 104*a*. The access point shown in FIG. 6 is AP 104*a*, but may also be illustrative of other access points (e.g. access points 104*b*, 104*c*). AP 104*a* includes a processor 602 to perform operations of the AP 104*a*. The processor 602 may be similar to the processor 502 described above.

The AP 104*a* includes an access point message generator 604 to generate network information communications and an access point data parser 606 for retrieving network information communications from the wireless terminal 114 and/or the external network A 108*a* as illustrated in FIG. 1. The access point message generator 604 may be similar to the terminal message generator 504 of FIG. 5, and the access point data parser 606 may be similar to the terminal data parser 506 of FIG. 5. As with the terminal message generator 504 and the terminal data parser 506 of FIG. 5, the access point message generator 604 and the access point data parser 606 may be implemented in software stored on a memory that is executable by the processor 602 or may be implemented in hardware with software functions executed by the processor 602. Alternatively, the access point message generator 604 and the access point data parser 606 may be implemented in a wireless communication subsystem (e.g., a wireless communication subsystem 612) using any combination of hardware, firmware, and/or software including instructions stored on a tangible computer readable medium and/or a non-transitory computer readable medium.

The AP 104*a* may also include a FLASH memory 608 and a RAM 610, both of which are coupled to the processor 602. The FLASH memory 608 and/or the random access memory ("RAM") 610 may be configured to store network information (e.g., network information 120 including discovery communications from FIG. 1). The RAM 610 may also be used to generate messages for communication with the wireless terminal 114 and/or to the external network A 108*a*. The RAM 610 may also store received messages communicated by the wireless terminal 114 and/or the external network A 108*a*.

To communicate with wireless terminals such as the wireless terminal 114, the AP 104*a* may include a wireless communication subsystem 612, which may be similar to the wireless communication subsystem 518 of the wireless terminal 114 illustrated in FIG. 5. To communicate with a WLAN-supported network or external network (e.g., the networks 106*a-c*, 108*a*, and 108*b* of FIG. 1), the AP 104*a* may include a network uplink communication interface 614.

FIG. 7 is a table of 802.11 ANQP information identifiers. The network information 120 described above may be assigned identifiers ("IDs") within the existing IEEE 802.11 ANQP information ID definitions. FIG. 7 illustrates one embodiment of Information IDs that may be used for the network information 120. In particular, WAN latency, 3GPP capability, mobility capability, hotspot capability, neighbor report, device (STA) identification, and multi-BSSID information are assigned information IDs, examples of which are shown in FIG. 7.

FIG. 8 is a table of Hotspot ANQP element subtype definitions. The network information 120 described above may be a subtype value within the existing Hotspot 2.0 ANQP elements. FIG. 8 illustrates one embodiment of the subtype values that may be assigned for the network information 120. In particular, WAN latency, 3GPP capability, mobility capability, hotspot capability, neighbor report, device (STA) identification, and multi-BSSID information are assigned subtype values, examples of which are shown in FIG. 8.

Figure 9:
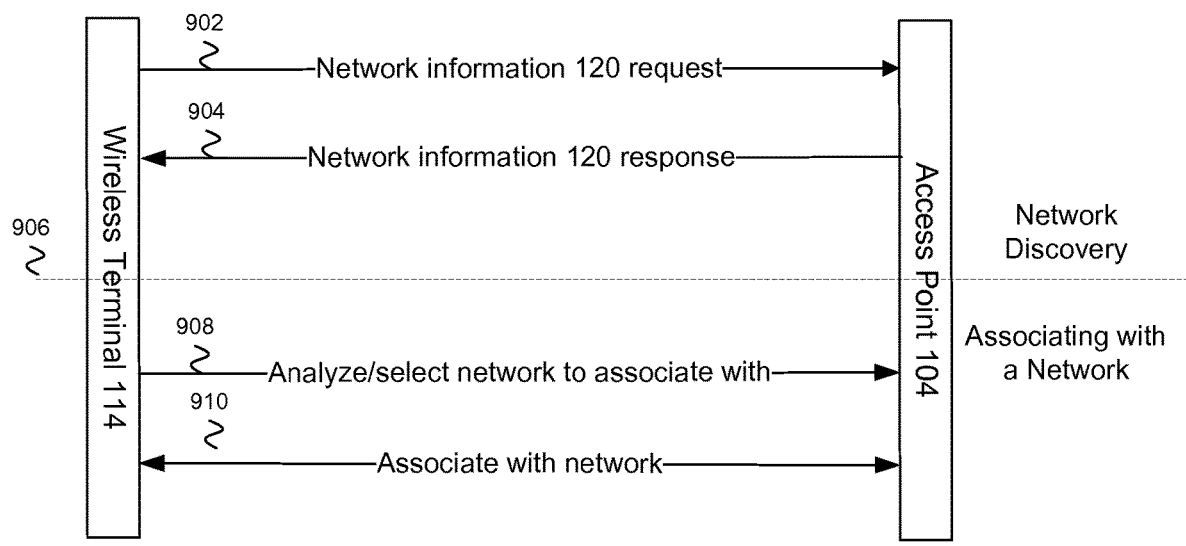
FIG. 9 illustrates network communications.

FIG. 9 illustrates network communications. The wireless terminal 114 requests 902 network information 120 from the access point 104. As discussed, the network information 120 may include any of the elements or features discussed with respect to FIG. 4. The access point 104 responds 904 to the request with the requested network information 120. Communications during network discovery (request 902 and response 904) are above the discovery line 906, and communications after network discovery are shown below the discovery line 906. In other words, the request and response of network information 120 occur during network discovery. Below the discovery line 906, the wireless terminal analyzes networks and selects 908 a network or access point to associate with 910. Communications below the discovery line 906 are communications post-discovery upon connecting or associating with a network. Network discovery may refer to the communications or messages that occur before the network is connected or associate with. In one embodiment, the discovery communications may be according to the access network query protocol ("ANQP"), which establish discovery communications in WLANs. Any of the network information 120 that is described with respect to FIG. 4 may be communicated during network discovery. In alternative embodiments, the request may originate from the access point 104 and the response may originate from the wireless terminal 114. For example, for the device identification 412, the access point 104 may request identification from the wireless terminal 114.

The system and process described may be encoded in a signal bearing medium, a computer readable medium such as a memory, programmed within a device such as one or more integrated circuits, and one or more processors or processed by a controller or a computer. If the methods are performed by software, the software may reside in a memory resident to or interfaced to a storage device, synchronizer, a communication interface, or non-volatile or volatile memory in communication with a transmitter. A circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

What is claimed is:

1. A non-transitory, tangible computer readable storage medium encoded with computer executable instructions, wherein execution of the computer executable instructions is for:

transmitting, from a wireless device to an access point (AP), an Access Network Query Protocol (ANQP) request for a Third Generation Partnership Project (3GPP) capabilities element prior to the wireless device associating with the AP; and receiving, at the wireless device prior to the wireless device associating with the AP, an ANQP response from the AP, wherein the ANQP response includes the 3GPP capabilities element, wherein the 3GPP capabilities element includes information about switching access between a wireless local area network (WLAN) and a cellular network.

2. The non-transitory, tangible computer readable storage medium of claim 1, wherein the 3GPP capabilities element further contains an indication of network support.

3. The non-transitory, tangible computer readable storage medium of claim 1, wherein the 3GPP capabilities element is received using a generic advertisement service (GAS).

4. The non-transitory, tangible computer readable storage medium of claim 3, wherein the GAS provides support for a network selection operation of the wireless device.

5. The non-transitory, tangible computer readable storage medium of claim 1, wherein the information about switching access between the WLAN and the cellular network includes one or more of:
Columbia;
mobile internet protocol (IP);
cellular IP;
hierarchical mobile IP (HMIP);
fast mobile IP (FMIP);
general packet radio service (GPRS) tunneling protocol (GTP); or
proxy mobile IP version 6 (PMIPv6).

6. The non-transitory, tangible computer readable storage medium of claim 1, wherein the 3GPP capabilities element is defined as a Wi-Fi Alliance element.

7. The non-transitory, tangible computer readable storage medium of claim 1, wherein the 3GPP capabilities element further includes information about at least one of:
Access Network Discovery and Selection Function (ANDSF) support;
Internet Protocol Multimedia Subsystem (IMS) support; or
Generic Access Network (GAN) support.

8. A method for communicating in a wireless network, comprising:
receiving, by an access point (AP) from a wireless device, an Access Network Query Protocol (ANQP) request for a Third Generation Partnership Project (3GPP) capabilities element prior to the wireless device associating with the AP; and
transmitting to the wireless device prior to the wireless device associating with the AP, an ANQP response, wherein the ANQP response includes the 3GPP capabilities element, wherein the 3GPP capabilities element includes information about switching access between a wireless local area network (WLAN) and a cellular network.

9. The method of claim 8, wherein the 3GPP capabilities element further contains an indication of network support.

10. The method of claim 8, wherein the 3GPP capabilities element is transmitted using a generic advertisement service (GAS).

11. The method of claim 10, wherein the GAS provides support for a network selection operation of the wireless device.

12. The method of claim 8, wherein the information about switching access between the WLAN and the cellular network includes one or more of:
Columbia;
mobile internet protocol (IP);
cellular IP;
hierarchical mobile IP (HMIP);
fast mobile IP (FMIP);
general packet radio service (GPRS) tunneling protocol (GTP); or
proxy mobile IP version 6 (PMIPv6).

13. The method of claim 8, wherein the 3GPP capabilities element is defined as a Wi-Fi Alliance element.

14. A non-transitory, tangible computer readable storage medium encoded with computer executable instructions, wherein execution of the computer executable instructions is for:
receiving, by an access point (AP) from a wireless device, an Access Network Query Protocol (ANQP) request for a Third Generation Partnership Project (3GPP) capabilities element prior to the wireless device associating with the AP; and
transmitting to the wireless device prior to the wireless device associating with the AP, an ANQP response, wherein the ANQP response includes the 3GPP capabilities element, wherein the 3GPP capabilities element includes information about switching access between a wireless local area network (WLAN) and a cellular network.

15. The non-transitory, tangible computer readable storage medium of claim 14, wherein the 3GPP capabilities element further contains an indication of network support.

16. The non-transitory, tangible computer readable storage medium of claim 14, wherein the 3GPP capabilities element is transmitted using a generic advertisement service (GAS).

17. The non-transitory, tangible computer readable storage medium of claim 16, wherein the GAS provides support for a network selection operation of the wireless device.

18. The non-transitory, tangible computer readable storage medium of claim 14, wherein the information about switching access between the WLAN and the cellular network includes one or more of:
Columbia;
mobile internet protocol (IP);
cellular IP;
hierarchical mobile IP (HMIP);
fast mobile IP (FMIP);
general packet radio service (GPRS) tunneling protocol (GTP); or
proxy mobile IP version 6 (PMIPv6).

19. The non-transitory, tangible computer readable storage medium of claim 14, wherein the 3GPP capabilities element is defined as a Wi-Fi Alliance element.

* * * * *